(12) United States Patent
Tang

(10) Patent No.: US 11,026,220 B2
(45) Date of Patent: Jun. 1, 2021

(54) RESOURCE ALLOCATION METHOD, APPARATUS AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/493,456

(22) PCT Filed: Mar. 23, 2017

(86) PCT No.: PCT/CN2017/077900
§ 371 (c)(1),
(2) Date: Sep. 12, 2019

(87) PCT Pub. No.: WO2018/170845
PCT Pub. Date: Sep. 27, 2018

(65) Prior Publication Data
US 2020/0137729 A1    Apr. 30, 2020

(51) Int. Cl.
*H04W 72/04*    (2009.01)
(52) U.S. Cl.
CPC ................ *H04W 72/042* (2013.01)
(58) Field of Classification Search
CPC .... H04L 5/0053; H04L 5/0094; H04W 28/16; H04W 4/00; H04W 4/70; H04W 4/80; H04W 72/0406; H04W 72/042; H04W 72/044; H04W 72/048; H04W 72/0486; H04W 72/0493
See application file for complete search history.

(56) References Cited

U.S. PATENT DOCUMENTS

| 2009/0083424 A1* | 3/2009 | Frederiksen | H04L 5/0094 709/226 |
| 2014/0177573 A1* | 6/2014 | Han | H04W 72/1242 370/329 |
| 2015/0078231 A1* | 3/2015 | Bergstrom | H04W 72/1268 370/311 |

(Continued)

FOREIGN PATENT DOCUMENTS

| CN | 102469587 | 5/2012 |
| CN | 103796315 | 5/2014 |

(Continued)

OTHER PUBLICATIONS

FIPS, Official Action for RU Application No. 2019132794/07, Jun. 25, 2020.

(Continued)

*Primary Examiner* — Kan Yuen
(74) *Attorney, Agent, or Firm* — Hodgson Russ LLP

(57) ABSTRACT

The present disclosure relates to the technical field of communications. Provided are a resource allocation method, apparatus and system applicable to an access network device. The method includes: acquiring J types of configuration information, each type of configuration information including information of a resource block to be allocated, where J≥1; and providing notification of the J types of configuration information.

16 Claims, 10 Drawing Sheets

(56) References Cited

U.S. PATENT DOCUMENTS

2016/0037543 A1    2/2016  Papasakellariou
2018/0069672 A1*   3/2018  Horiuchi ........... H04W 72/0446
2018/0227938 A1*   8/2018  Lee ...................... H04L 5/0053

FOREIGN PATENT DOCUMENTS

| CN | 105554892 | 5/2016 |
| RU | 2602808 | 11/2016 |
| RU | 2608950 | 1/2017 |
| WO | 2016161957 | 10/2016 |

OTHER PUBLICATIONS

WIPO, ISR for PCT/CN2017/077900, Dec. 8, 2017.
European Patent Office, Search Report for Appl. No. EP17902384.1, dated Feb. 20, 2020.
CIPO, Office Action for CA Application No. 3056006 dated Oct. 16, 2020.
EPO, Office Action for EP Application No. 17902384.1 dated Oct. 13, 2020.
IPI, Office Action for IN Application No. 201917040880, dated Jan. 31, 2021.

* cited by examiner

RESOURCE ALLOCATION METHOD, APPARATUS AND SYSTEM

CROSS-REFERENCE TO RELATED APPLICATION

This application is a U.S. national phase application of International Application No. PCT/CN2017/077900, filed Mar. 23, 2017, the entire disclosure of which is incorporated herein by reference.

TECHNICAL FIELD

The present disclosure relates to the communication technology field, and more particularly, to a resource allocation method, apparatus and system.

BACKGROUND

In a wireless communication system adopting a base station for centralized scheduling control, the allocation of all available resources of the system is performed by the base station. For example, when a User Equipment (UE) performs an Ultra-Reliable Low Latency Communication (URLLC) service, the base station needs to allocate a resource for transmitting service data to the UE. Generally, the base station uses a Physical Resource Block (PRB) as a basic unit to allocate resource (that is, frequency domain resource) to a UE. The base station carries configuration information required for transmitting the service data in Downlink Control Information (DCI) of a control channel, and sends the DCI to the UE. The configuration information includes information of the PRB allocated by the base station for the UE, the granularity is fine, and the data amount of the DCI is large. In order to ensure the reliability of the control channel, the data amount of the DCI needs to be small.

In related art, in order to reduce the data amount of the DCI, the base station uses a resource block including a plurality of PRBs as the basic unit to allocate resource for the UE, therefore, the configuration information carried by the DCI sent by the base station to the UE includes the information of the resource block, and the granularity is relatively coarse.

In the process of implementing the present disclosure, at least following problems have been found in the related art.

In the above process, the information of the resource block is directly obtained by the base station from the protocol, and the content of the configuration information carried by the DCI sent by the base station to the UE is fixed, so flexibility of resource allocation is poor.

SUMMARY

In order to solve the problem that the flexibility of resource allocation in the related art is poor, embodiments of the present disclosure provide a resource allocation method, apparatus, and system. The technical solutions are as follows.

In a first aspect, there is provided a resource allocation method, applied to an access network device, including:

obtaining J types of configuration information, each type of the configuration information including information of a resource block to be allocated, $J \geq 1$; and notifying the J types of configuration information.

Optionally, after the notifying the J types of configuration information, the method further includes:

selecting first target configuration information from the J types of configuration information, the first target configuration information including information of a resource block allocated for a target User Equipment (UE) for transmitting service data; and sending notification information including the first target configuration information to the target UE.

Optionally, after the notifying the J types of configuration information, the method further includes:

receiving indication information sent by the target UE, the indication information being used to indicate at least one of a device type of the target UE, a service type of a service performed by the target UE, and a service level of a service performed by the target UE; and the selecting the first target configuration information from the J types of configuration information includes:

selecting the first target configuration information from the J types of configuration information according to the indication information.

Optionally, each type of the configuration information includes first sub-information or second sub-information, the first sub-information includes an identifier of a resource block allocated for a target User Equipment (UE) and a number K of Physical Resource Blocks (PRB) included in the resource block, $K \geq 1$, and the second sub-information includes a number N of the resource block allocated for the target UE, the identifier of the resource block, and information of the PRB included in the resource block, $N \geq 1$.

Optionally, each type of the configuration information includes the first sub-information, and after the notifying the J types of configuration information, the method further includes:

selecting one of a plurality of preset mapping manners as a target mapping manner, each of the mapping manners being used to indicate a grouping manner of the PRB; and sending information including the target mapping manner to the target UE.

Optionally, $J \geq 2$, after the selecting first target configuration information from the J types of configuration information, the method further includes:

selecting second target configuration information from the J types of configuration information, the second target configuration information being different from the first target configuration information; and sending notification information including the second target configuration information to the target UE.

Optionally, before the selecting the second target configuration information from the J types of configuration information, the method further includes:

receiving configuration request information sent by the target UE, the configuration request information being used to request the access network device to select the second target configuration information from the J types of configuration information.

Optionally, the notification information includes x-bit binary data and y-bit binary data located after the x-bit binary data, $x \geq 1$, $y \geq 1$, wherein, the x-bit binary data is used to indicate an identifier of the first target configuration information or second target configuration information, the y-bit binary data is used to indicate an identifier of a resource block allocated for the target UE, the second target configuration information is selected by the access network device from the J types of configuration information, and the second target configuration information is different from the first target configuration information.

Optionally, the notifying the J types of configuration information includes:

notifying the J types of configuration information by at least one of System Information (SI), a Radio Resource Control (RRC) protocol, a Medium Access Control (MAC) Channel Element (CE), Downlink Control Information (DCI), and a Physical Broadcast Channel (PBCH).

Optionally, the sending the notification information including the target configuration information to the target UE includes:

sending the notification information including the target configuration information to the target UE by using at least one of an RRC protocol, a MAC CE and DCI, the target configuration information including the first target configuration information or second target configuration information, the second target configuration information being selected by the access network device from the J types of configuration information, and the second target configuration information being different from the first target configuration information.

Optionally, the information of the PRB includes an identifier of the PRB.

Optionally, after the notifying the J types of configuration information, the method further includes:

allocating a resource block used for transmitting service data to a target User Equipment (UE) according to information of a resource block included in target configuration information, the target configuration information being configuration information required by the target UE and screened from the J types of configuration information.

In a second aspect, there is provided a resource allocation method, applied to a target User Equipment (UE), including:

receiving J types of configuration information notified by an access network device, the J types of configuration information being acquired by the access network device in advance, and each of the configuration information including information of a resource block to be allocated, J≥1.

Optionally, after the receiving the J types of configuration information notified by the access network device, the method further includes:

receiving notification information including first target configuration information and sent by the access network device, the first target configuration information being selected by the access network device from the J types of configuration information, the first target configuration information including information of a resource block allocated for the target UE for transmitting service data.

Optionally, after the receiving the J types of configuration information notified by the access network device, the method further includes:

obtaining indication information, the indication information being used to indicate at least one of a device type of the target UE, a service type of a service performed by the target UE, and a service level of a service performed by the target UE; and sending the indication information to the access network device.

Optionally, each type of the configuration information includes first sub-information or second sub-information, the first sub-information includes an identifier of a resource block allocated for the target UE and a number K of Physical Resource Blocks (PRB) included in the resource block, K≥1, and the second sub-information includes a number N of the resource block allocated for the target UE, the identifier of the resource block, and information of the PRB included in the resource block, N≥1.

Optionally, each type of the configuration information includes the first sub-information, and after the receiving the J types of configuration information notified by the access network device, the method further includes:

determining, according to the K in target configuration information, the number of resource blocks allocated by the access network device for the target UE, the target configuration information being configuration information required by the target UE and screened from the J types of configuration information; and determining a frequency domain position where the resource block is located according to an identifier of a resource block in the target configuration information.

Optionally, each of the configuration information includes the first sub-information, and after the receiving the J types of configuration information notified by the access network device, the method further includes:

receiving information including a target mapping manner and sent by the access network device, the target mapping manner being selected by the access network device from a plurality of preset mapping manners, each of the mapping manners being used to indicate a grouping manner of the PRB; and determining information of the PRB included in the resource block allocated by the access network device for itself according to the target mapping manner and the first sub-information.

Optionally, each of the configuration information includes the first sub-information, and after the receiving the J types of configuration information notified by the access network device, the method further includes:

determining information of the PRB included in the resource block allocated by the access network device for the target UE according to a preset mapping manner, the mapping manner being used to indicate a grouping manner of the PRB.

Optionally, J≥2, after the receiving the notification information including the first target configuration information and sent by the access network device, the method further includes:

receiving notification information including second target configuration information and sent by the access network device, the second target configuration information being selected by the access network device from the J types of configuration information, and the second target configuration information being different from the first target configuration information.

Optionally, after the receiving the notification information including the first target configuration information and sent by the access network device, the method further includes:

sending configuration request information to the access network device, the configuration request information being used to request the access network device to select the second target configuration information from the J types of configuration information.

Optionally, the notification information includes x-bit binary data and y-bit binary data located after the x-bit binary data, x≥1, y≥1, wherein, the x-bit binary data is used to indicate an identifier of the first target configuration information or second target configuration information, the y-bit binary data is used to indicate an identifier of a resource block allocated for the target UE, the second target configuration information is selected by the access network device from the J types of configuration information, and the second target configuration information is different from the first target configuration information.

Optionally, after the receiving the J types of configuration information notified by the access network device, the method further includes:

transmitting service data by adopting the resource block allocated by the access network device for the target UE according to the information of the resource block included in the target configuration information, the target configuration information being configuration information required by the target UE and screened from the J types of configuration information.

In a third aspect, there is provided a resource allocation apparatus, applied to an access network device, including:

an obtaining module, configured to obtain J types of configuration information, each type of the configuration information including information of a resource block to be allocated, J≥1; and a notification module, configured to notify the J types of configuration information.

Optionally, the apparatus further includes:

a first selection module, configured to select first target configuration information from the J types of configuration information, the first target configuration information including information of a resource block allocated for a target User Equipment (UE) for transmitting service data; and a first sending module, configured to send notification information including the first target configuration information to the target UE.

Optionally, the apparatus further includes:

a first receiving module, configured to receive indication information sent by the target UE, the indication information being used to indicate at least one of a device type of the target UE, a service type of a service performed by the target UE, and a service level of a service performed by the target UE; and wherein the first selection module is configured to:

select the first target configuration information from the J types of configuration information according to the indication information.

Optionally, each type of the configuration information includes first sub-information or second sub-information, the first sub-information includes an identifier of a resource block allocated for a target User Equipment (UE) and a number K of Physical Resource Blocks (PRB) included in the resource block, K≥1, and the second sub-information includes a number N of the resource block allocated for the target UE, the identifier of the resource block, and information of the PRB included in the resource block, N≥1.

Optionally, each type of the configuration information includes the first sub-information, and the apparatus further includes:

a second selection module, configured to select one of a plurality of preset mapping manners as a target mapping manner, each of the mapping manners being used to indicate a grouping manner of the PRB; and a second sending module, configured to send information including the target mapping manner to the target UE.

Optionally, J≥2, and the apparatus further includes:

a third selection module, configured to select second target configuration information from the J types of configuration information, the second target configuration information being different from the first target configuration information; and wherein the first sending module is further configured to send notification information including the second target configuration information to the target UE.

Optionally, the apparatus further includes:

a second receiving module, configured to receive configuration request information sent by the target UE, the configuration request information being used to request the access network device to select the second target configuration information from the J types of configuration information.

Optionally, the notification information includes x-bit binary data and y-bit binary data located after the x-bit binary data, x≥1, y≥1, wherein, the x-bit binary data is used to indicate an identifier of the first target configuration information or second target configuration information, the y-bit binary data is used to indicate an identifier of a resource block allocated for the target UE, the second target configuration information is selected by the access network device from the J types of configuration information, and the second target configuration information is different from the first target configuration information.

Optionally, the notification module is configured to:

notify the J types of configuration information by at least one of System Information (SI), a Radio Resource Control (RRC) protocol, a Medium Access Control (MAC) Channel Element (CE), Downlink Control Information (DCI), and a Physical Broadcast Channel (PBCH).

Optionally, the first sending module is configured to:

send the notification information including the target configuration information to the target UE by using at least one of an RRC protocol, a MAC CE and DCI, the target configuration information including the first target configuration information or the second target configuration information, the second target configuration information being selected by the access network device from the J types of configuration information, and the second target configuration information being different from the first target configuration information.

Optionally, the information of the PRB includes an identifier of the PRB.

Optionally, the apparatus further includes:

an allocation module, configured to allocate a resource block used for transmitting service data to a target User Equipment (UE) according to information of a resource block included in target configuration information, the target configuration information being configuration information required by the target UE and screened from the J types of configuration information.

In a fourth aspect, there is provided a resource allocation apparatus, applied to a target User Equipment (UE), including:

a first receiving module, configured to receive J types of configuration information notified by an access network device, the J types of configuration information being acquired by the access network device in advance, and each of the configuration information including information of a resource block to be allocated, J≥1.

Optionally, the apparatus further includes:

a second receiving module, configured to receive notification information including first target configuration information and sent by the access network device, the first target configuration information being selected by the access network device from the J types of configuration information, the first target configuration information including information of a resource block allocated for the target UE for transmitting service data.

Optionally, the apparatus further includes:

an obtaining module, configured to obtain indication information, the indication information being used to indicate at least one of a device type of the target UE, a service type of a service performed by the target UE, and a service level of a service performed by the target UE; and a first sending module, configured to send the indication information to the access network device.

Optionally, each type of the configuration information includes first sub-information or second sub-information, the first sub-information includes an identifier of a resource block allocated for a target UE and a number K of Physical Resource Blocks (PRB) included in the resource block, $K \geq 1$, and the second sub-information includes a number N of the resource block allocated for the target UE, the identifier of the resource block, and information of the PRB included in the resource block, $N \geq 1$.

Optionally, each type of the configuration information includes the first sub-information, and the apparatus further includes:

a first determining module, configured to determine, according to the K in target configuration information, the number of resource blocks allocated by the access network device for the target UE, the target configuration information being configuration information required by the target UE and screened from the J types of configuration information; and a second determining module, configured to determine a frequency domain position where the resource block is located according to an identifier of a resource block in the target configuration information.

Optionally, each of the configuration information includes the first sub-information, and the apparatus further includes:

a third receiving module, configured to receive, information including a target mapping manner and sent by the access network device, the target mapping manner being selected by the access network device from a plurality of preset mapping manners, each of the mapping manners being used to indicate a grouping manner of the PRB; and a third determining module, configured to determine information of the PRB included in the resource block allocated by the access network device for itself according to the target mapping manner and the first sub-information.

Optionally, each of the configuration information includes the first sub-information, and the apparatus further includes:

a fourth determining module, configured to determine information of the PRB included in the resource block allocated by the access network device for the target UE according to a preset mapping manner, the mapping manner being used to indicate a grouping manner of the PRB.

Optionally, $J \geq 2$, the apparatus further includes:

a fourth receiving module, configured to receive notification information including second target configuration information and sent by the access network device, the second target configuration information being selected by the access network device from the J types of configuration information, and the second target configuration information being different from the first target configuration information.

Optionally, the apparatus further includes:

a second sending module, configured to send configuration request information to the access network device, the configuration request information being used to request the access network device to select the second target configuration information from the J types of configuration information.

Optionally, the notification information includes x-bit binary data and y-bit binary data located after the x-bit binary data, $x \geq 1$, $y \geq 1$, wherein, the x-bit binary data is used to indicate an identifier of the first target configuration information or second target configuration information, the y-bit binary data is used to indicate an identifier of a resource block allocated for the target UE, the second target configuration information is selected by the access network device from the J types of configuration information, and the second target configuration information is different from the first target configuration information.

Optionally, the apparatus further includes:

a transmission module, configured to transmit service data by adopting the resource block allocated by the access network device for the target UE according to the information of the resource block included in the target configuration information, the target configuration information being configuration information required by the target UE and screened from the J types of configuration information.

In a fifth aspect, there is provided a resource allocation apparatus, applied to an access network device, including: a processor and a memory, the memory storing one or more computer programs, and the processor implementing following steps when executing the computer program:

obtaining J types of configuration information, each type of the configuration information including information of a resource block to be allocated, $J \geq 1$; and notifying the J types of configuration information.

In a sixth aspect, there is provided a resource allocation apparatus, applied to a target User Equipment (UE), including: a processor and a memory, the memory storing one or more computer programs, and the processor implementing following steps when executing the computer program:

receiving J types of configuration information notified by an access network device, the J types of configuration information being acquired by the access network device in advance, and each of the configuration information including information of a resource block to be allocated, $J \geq 1$.

In a seventh aspect, there is provided a resource allocation system, including: an access network device and a target User Equipment (UE), the access network device includes the resource allocation apparatus of the third aspect;

the target UE includes the resource allocation apparatus of the fourth aspect.

In an eighth aspect, there is provided a resource allocation system, including: an access network device and a target User Equipment (UE), the access network device includes the resource allocation apparatus of the fifth aspect;

the target UE includes the resource allocation apparatus of the sixth aspect.

The beneficial effects brought by the technical solutions provided by the embodiments of the present disclosure are as follows.

The access network device obtains J ($J \geq 1$) types of configuration information, and then notifies the J types of configuration information. The access network device or the target UE can screen out the target configuration information required by the target UE from the J types of configuration information, and the target configuration information required by the target UE selected from the J types of configuration information can be flexibly adjusted during the process of performing the service, to meet the requirement of the target UE for transmitting the service data. Each type of the configuration information includes information of a resource block to be allocated. Compared with the related art, the content of the configuration information is no longer fixed, so the flexibility of resource allocation is improved.

BRIEF DESCRIPTION OF THE DRAWINGS

In order to illustrate the technical solutions of the embodiments of the present disclosure more clearly, drawings used in the description of the embodiments will be briefly described below. Obviously, the drawings in the following description are only some of the embodiments in the present disclosure. Those skilled in the art may obtain other drawings according to these drawings without any creative work.

DETAILED DESCRIPTION

Figure 1:
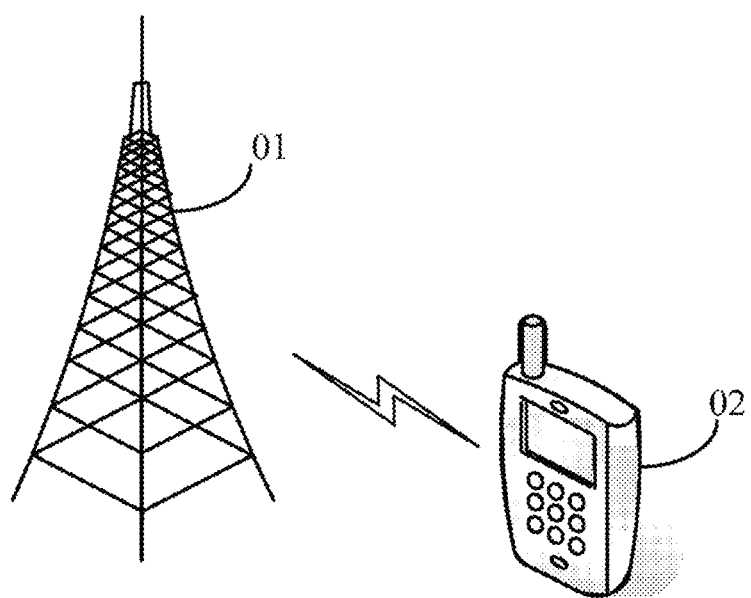
FIG. 1 is a schematic diagram showing an implementation environment involved in a resource allocation method according to an embodiment of the present disclosure.

In order to make objects, technical solutions and advantages of the present disclosure clearer, the embodiments of the present disclosure will be further described in detail below with reference to accompanying drawings.

NewRadio (NR) refers to the Fifth Generation (5G) new air interface, and the interconnection of smart phones, cars, even the entire urban infrastructure and the like may be achieved through NR. In addition to acting as a unified connection framework, NR may improve a data speed, capacity, latency, reliability, efficiency and coverage of a network to a new level, and may make full use of available spectrum resource per bit. Three technical scenarios of 5G defined by the 3rd Generation Partnership Project (3GPP) are: Enhanced Mobile Broadband (eMBB), Massive Machine Type Communication (mMTC) and URLLC. In the eMBB technical scenario, a peak rate of Internet access by user equipment may reach 10 Gbps (gigabit per second) or even 20 Gbps, thereby supporting the development of large-bandwidth applications such as virtual reality, ubiquitous video broadcast and sharing, and cloud access anytime, anywhere. In the mMTC technical scenario, the number of connections between people and things supported by 5G network reaches 1 million/km$^2$. In the URLLC technical scenario, the 5G network has a latency of 1 millisecond, which promotes vertical industry applications to be realized, such as intelligent manufacturing, remote mechanical control, assisted driving, automatic driving and other services with low latency and high reliability. Taking URLLC service as an example, in order to meet the low latency requirement of the URLLC service, transmission time of the service data may be shortened, or a retransmission number of the service data may be reduced. In order to shorten the transmission time of the service data, a dynamic mini-slot technique is introduced. For example, in a scenario in which service resource of the eMBB and URLLC is multiplexed, one slot for transmitting eMBB service data may be occupied by a plurality of URLLC services.

In a 5G or NR system, when the UE performs the URLLC service, the access network device (such as a base station) needs to allocate resource for transmitting the service data to the UE. For example, the access network device carries configuration information in DCI of Physical Downlink Control Channel (PDCCH), and then sends the DCI to the UE. The configuration information carried in the DCI includes information of resource allocated by the access network device for the UE. If a PRB is used as a basic unit, the configuration information carried in the DCI includes the information of the PRB, granularity of the resource is fine, and a data amount of the DCI is large. As a result, the reliability of the control channel is poor. In order to reduce the data amount of the DCI, in the related art, a resource block including a plurality of PRBs is used as the basic unit, and the granularity of the resource is coarse. However, the information of the PRB included in the resource block is directly obtained by the access network device from the protocol, and the content of the configuration information obtained by the UE is fixed, and therefore, the flexibility of resource allocation is poor.

Since the URLLC service needs to meet the requirement of high reliability and avoid retransmission of the service data as much as possible, a lower level of Modulation and Coding Scheme (MCS) needs to be adopted. In addition, the service data of the URLLC service occupies less time resources each time it is transmitted. To ensure demodulation performance, it needs to occupy more frequency domain resource. Based on this, the embodiments of the present disclosure implements resource allocation of coarse granularity in the frequency domain. In the embodiments of the present disclosure, the access network device may obtain at least one type of the configuration information. The target configuration information required by the target UE may be screened out from the at least one type of the configuration information, the content of the configuration information obtained by the UE is no longer fixed, and the flexibility of resource allocation is high.

FIG. 1 is a schematic diagram showing an implementation environment involved in a resource allocation method according to an embodiment of the present disclosure. As is shown in FIG. 1, the implementation environment may include an access network device 01 and at least one UE02 managed by the access network device 01. The at least one UE02 includes a target UE02.

For example, the access network device 01 may be a Base Transceiver Station (BTS) in a Global System for Mobile Communication (GSM) system, a NodeB (NB) in a Wideband Code Division Multiple Access (WCDMA) system, an evolved Node B (eNB) in a Long Term Evolution (LTE) system, and an access network device in a 5G system or an access network device in a future evolved Public Land Mobile Network (PLMN) network.

In the present implementation environment and in various embodiments described below, the user equipment 02 will be introduced as a UE in the general sense. In addition, the user equipment may also be a mobile station, an access terminal, a subscriber unit, a subscriber station, a mobile station, a remote station, a remote terminal, a mobile device, a user terminal, a terminal, a wireless communication device, a user agent, or a user device. The user equipment may be a cellular phone, a cordless phone, a Session Initiation Protocol (SIP) phone, a Wireless Local Loop (WLL) station, a Personal Digital Assistant (PDA), a handheld device with wireless communication capability, a computing device or other processing devices connected to a wireless modem, an in-vehicle device, a wearable device, and a mobile station in a 5G network or a terminal device in a future evolved PLMN network. In addition, the user equipment may also include other devices capable of communicating with an access network device (e.g., a base station), such as a relay.

Figure 2:
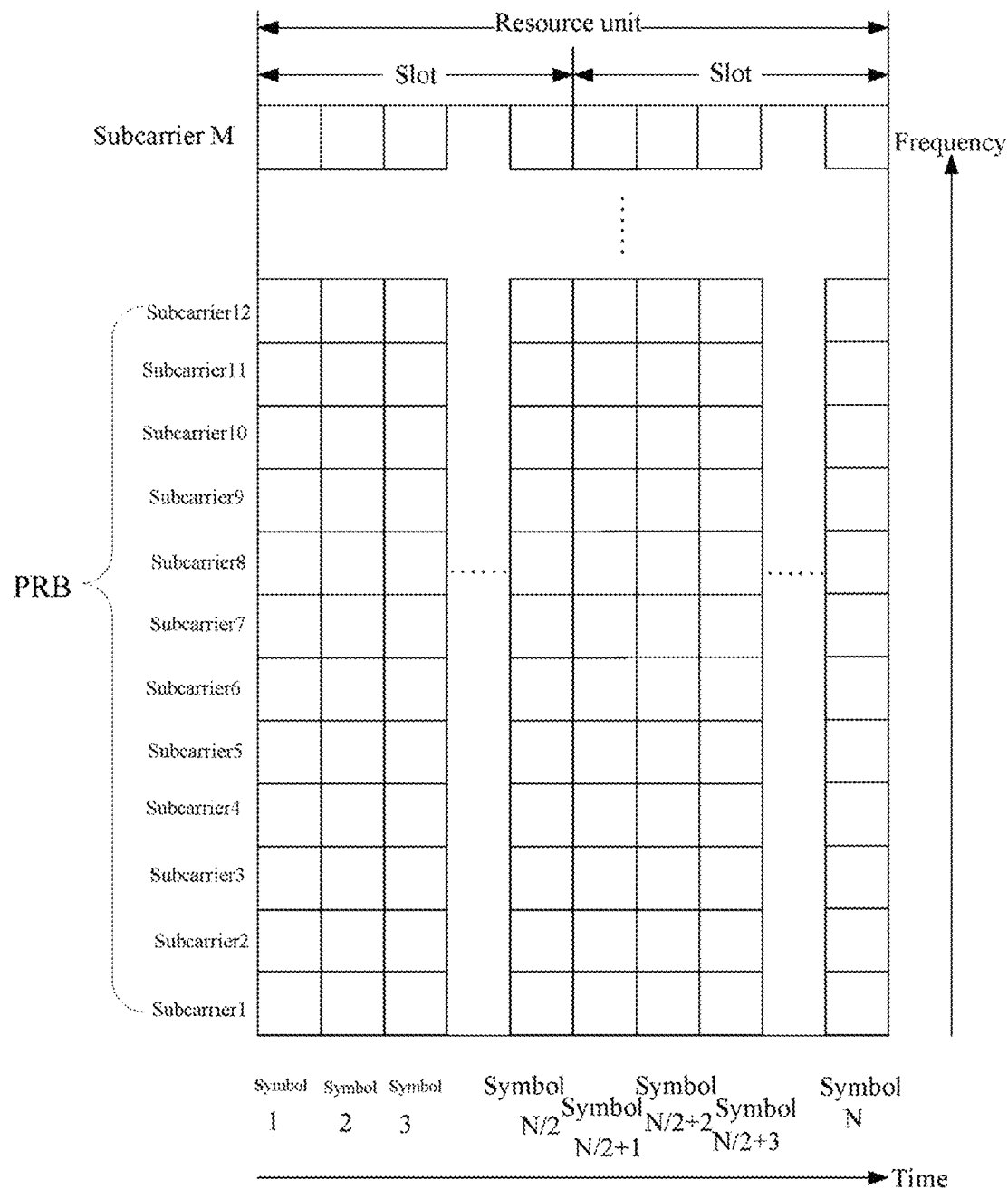
FIG. 2 is a schematic diagram showing a logical structure of a resource unit according to an embodiment of the present disclosure.

Referring to FIG. 1, in the present embodiment environment and following embodiments, the access network device 01 and the UE02 establish a communication connection and may communicate through the communication connection. The information transmitted by the access network device 01 and the UE02 during communication may include, but is not limited to, System Information (SI), Physical Broadcast Channel (PBCH), Radio Resource Control (RRC) protocol, Medium Access Control (MAC) Channel Element (CE), DCI, and the like. The access network device 01 and the UE02 may transmit information through a channel, and the channel may be carried on a frequency domain resource. For example, the access network device 01 and the UE02 may transmit DCI through the PDCCH, and the PDCCH may be carried on a frequency domain resource in a resource unit. The access network device 01 may map the DCI to the frequency domain resource occupied by the PDCCH in the resource unit, and send the DCI to the UE02 through the frequency domain resource to complete the allocation of the frequency domain resource for the UE. The resource unit may be as shown in FIG. 2. The resource unit 100 includes N symbols in the time domain and M subcarriers in the frequency domain. The symbol may be an OFDM symbol, both M and N are positive integers, and specific values of M and N may be set as needed. For example, in the NR, N may be equal to 7 or 14. The resource unit 100 includes two slots, and the two slots include N symbols. The smallest resource unit in the resource unit 100 is a Resource Element (RE), and each resource element includes one symbol in the time domain and one subcarrier in the frequency domain. In the frequency domain, each PRB includes a plurality of subcarriers. In actual applications, the number of subcarriers included in the resource unit 100 and the like may be set according to actual need.

Figure 3:
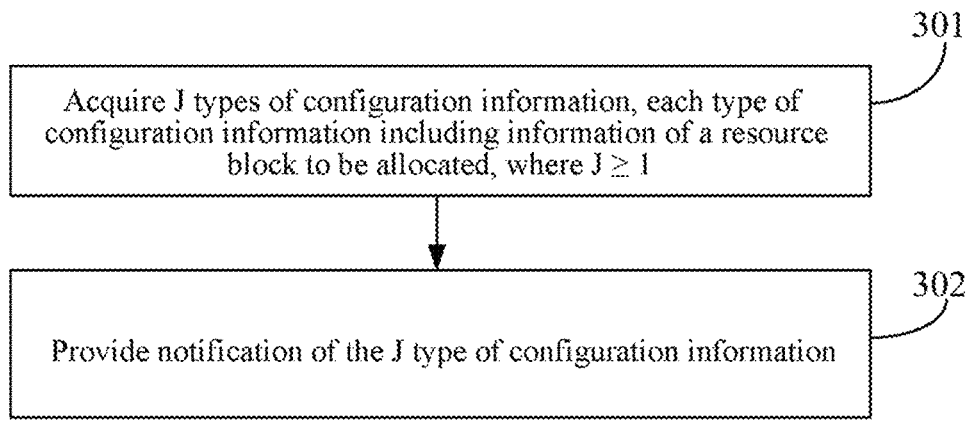
FIG. 3 is a flowchart showing a resource allocation method according to an embodiment of the present disclosure.

The embodiments of the present disclosure provide a resource allocation method, which is applied to the access network device 01 in the implementation environment shown in FIG. 1. As shown in FIG. 3, the method includes the following steps.

In step 301, J types of configuration information is obtained, each type of the configuration information including information of a resource block to be allocated, $J \geq 1$.

The J types of configuration information are predetermined by the access network device according to an allocation policy. For example, the access network device may obtain J types of configuration according to service processing status, network load, and the like of individual UEs managed by the access network device.

In step 302, the J types of configuration information is notified.

The target configuration information required by the target UE may be screened out from the J types of configuration information.

In summary, in the resource allocation method provided by the embodiments of the present disclosure, the access network device obtains J ($J \geq 1$) types of configuration information, and then notifies the J types of configuration information, wherein each type of the configuration information includes information of a resource block to be allocated, and the target configuration information required by the target UE may be screened out from the J types of the configuration information. Compared with the related art, the content of the configuration information is no longer fixed, so the flexibility of resource allocation is improved.

Figure 4:
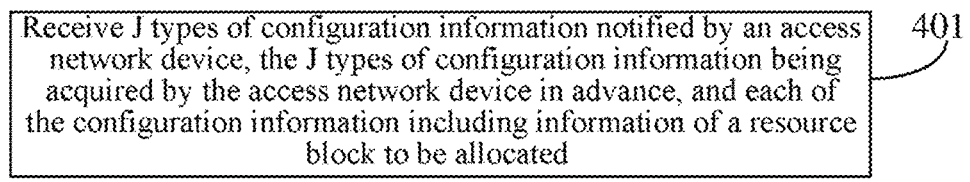
FIG. 4 is a flowchart showing another resource allocation method according to an embodiment of the present disclosure.

The embodiments of the present disclosure provide another resource allocation method, which is applied to the target UE02 in the implementation environment shown in FIG. 1. As shown in FIG. 4, the method includes the following steps.

In step 401, J types of configuration information notified by an access network device is received, the J types of configuration information being acquired by the access network device in advance, and each of the configuration information including information of a resource block to be allocated, $J \geq 1$.

In summary, in the resource allocation method provided by the embodiments of the present disclosure, the target UE may receive the J ($J \geq 1$) types of configuration information notified by the access network device. The J types of configuration information is obtained in advance by the access network device, and each configuration information includes information of the resource block to be allocated, and the target configuration information required by the target UE may be screened out from the J types of configuration information. Compared with the related art, the content of the configuration information is no longer fixed, so the flexibility of resource allocation is improved.

Figure 5:
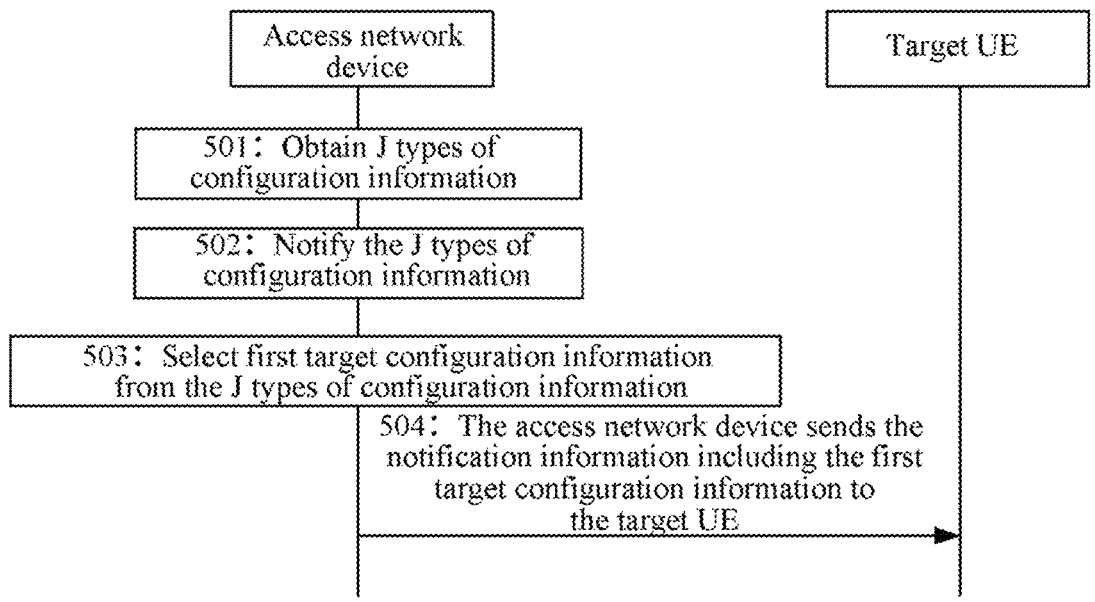
FIG. 5 is a flowchart showing another resource allocation method according to an embodiment of the present disclosure.

The embodiments of the present disclosure provide another resource allocation method, which is applied to the implementation environment shown in FIG. 1. As shown in FIG. 5, the method includes the following steps.

In step 501, the access network device obtains J types of configuration information.

Each type of the configuration information includes information of a resource block to be allocated, $J \geq 1$.

The J types of configuration information are predetermined by the access network device according to an allocation policy. For example, the access network device may obtain J types of configuration according to service processing status, network load, and the like of individual UEs managed by the access network device.

In step 502, the access network device notifies the J types of configuration information.

The target configuration information required by the target UE may be screened out from the J types of configuration information. In the embodiments of the present disclosure, the access network device can screen out the target configuration information required by the target UE from the J types of configuration information, and the target UE can also screen out the target configuration information required by the target UE from the J types of configuration information. In the embodiments of the present disclosure, when the access network device allocates resource for the UE, the resource block is used as a basic unit, the granularity of the resource is relatively coarse, and the access network device may allocate one or more resource blocks to the UE to transmit the service data. For example, the UE may transmit the service data of the URLLC service.

Optionally, the access network device may broadcast the J types of configuration information.

For example, the access network device may broadcast the J types of configuration information through at least one of SI and PBCH. That is, the access network device may broadcast the J types of configuration information through the SI, or may broadcast the J types of configuration information through the PBCH, or may also broadcast the J types of configuration information through the SI and the PBCH.

Optionally, the target configuration information required by the target UE and screened out from the J types of configuration information includes first target configuration information. For example, the target UE may select the first target configuration information from the J types of configuration information based on at least one of a device type of the target UE, a service type of a service performed by the target UE, a service level of a service performed by the target UE, a service processing status of the target UE, and a service change status of the target UE. The first target configuration information includes information of a resource block allocated for the target UE for transmitting the service data.

Optionally, each type of the configuration information includes first sub-information or second sub-information.

The first sub-information includes an identifier of a resource block allocated for a target User Equipment (UE) and a number K of Physical Resource Blocks (PRB) included in the resource block, K≥1.

The second sub-information includes a number N of the resource block allocated for the target UE, the identifier of the resource block, and information of the PRB included in the resource block, N≥1. For example, the information of the PRB includes an identifier of the PRB.

For example, when the configuration information includes the first sub-information, the configuration information may be: the identifier B1 of the first resource block, the first resource block including 5 PRBs; the identifier B2 of the second resource block, the second resource block including 5 PRBs. After receiving the J types of configuration information notified by the access network device, the target UE selects the first target configuration information from the J types of configuration information, and the target UE may determine, according to K (that is, the number of PRBs included in the resource block) in the first target configuration information, the number of resource blocks allocated by the access network device for the target UE; the target UE determines the frequency domain position where the resource block is located according to the identifier of the resource block in the first target configuration information. For example, a network bandwidth is 100M, a visible bandwidth of the target UE is 30M, a total number of PRBs to be allocated is 100, and the number K of PRBs included in the resource block is equal to 3. Then, the network bandwidth occupied by each PRB is 1M, the network bandwidth occupied by one resource block is 3M, and the number of resource blocks allocated by the access network device for the target UE is (30/3). At the same time, the target UE may determine the frequency domain position where the resource block is located according to the identifier of the resource block, so as to facilitate the target UE to transmit the service data subsequently.

Since the first sub-information does not include the information of the PRB, the target UE may determine the identifier of the PRB included in the resource block according to the corresponding mapping manner. The mapping manner is used to indicate the grouping manner of the PRB. For example, the mapping manner may be used to indicate the identifier of the PRB included in one resource block, and may also be used to indicate the relationship between the PRBs included in one resource block. For example, the configuration information is: the identifier B1 of the first resource block, the first resource block including 5 PRBs; the identifier B2 of the second resource block, the second resource block including 5 PRBs. For example, the mapping manner may be used to indicate that the identifiers of the five PRBs included in the first resource block are: P1, P2, P3, P4 and P5, respectively, and the identifiers of the five PRBs included in the second resource block are P6, P7, P8, P9 and P10, respectively. The mapping manner may also be used to indicate that the identifiers of the five PRBs included in the first resource block are: P1, P3, P5, P7, and P9, and the identifiers of the five PRBs included in the second resource block are: P2, P4, P6, P8 and P10. The mapping manner may also be used to indicate that the five PRBs included in each resource block are consecutive in the frequency domain (the PRBs that are adjacent in the frequency domain are consecutive PRBs), or indicate that the five PRBs included in each resource block are discontinuous in the frequency domain. In this way, the same first sub-information may correspond to a plurality of resource allocation methods.

In the embodiments of the present disclosure, the mapping manner for indicating the grouping manner of the PRB may be obtained in various manners. On one hand, the access network device may select one of a plurality of preset mapping manners as the target mapping manner, and each mapping manner is used to indicate the grouping manner of the PRB. The access network device then transmits information including the target mapping manner to the target UE. Then, the target UE may determine the information of the PRB included in the resource block allocated by the access network device for itself according to the target mapping manner and the first sub-information. The plurality of mapping manners may be mapping manners specified in the protocol.

On the other hand, the target UE may determine the information of the PRB included in the resource block allocated by the access network device for the target UE according to a preset mapping manner, and the mapping manner is used to indicate the grouping manner of the PRB. The mapping manner may be a mapping manner specified in the protocol.

For example, when the configuration information includes the second sub-information, the configuration information may be: two resource blocks (that is, N=2) are allocated for the target UE, the identifier of the first resource block is B1, and the identifiers of the PRBs included in the first resource block are P1, P2, P3, P4, and P5, respectively. The identifier of the second resource block is B2, and the identifiers of the PRBs included in the second resource block are P6, P7, P8, P9, and P10, respectively. After receiving the J types of configuration information notified by the access network device, the target UE selects the first target configuration information from the J types of configuration information, and the target UE may directly obtain the number N of resource blocks allocated by the access network device for the target UE from the first target configuration information. At the same time, the target UE may determine the frequency domain position where the resource block is located according to the identifier of the resource block, and the target UE may further determine the frequency domain position where the PRB is located according to the identifier of the PRB included in the resource block.

It should be noted that the PRB included in the resource block in the second sub-information may be continuous or discontinuous in the frequency domain. The PRB packet efficiency corresponding to consecutive PRBs is higher, and the PRB packet efficiency corresponding to discontinuous PRBs is lower. However, data transmission error rates of the discontinuous PRBs are quite different. Therefore, when the data transmission error rate of a certain PRB in the discontinuous PRB is high, the data transmission error rate of the remaining PRBs may be low, so discontinuous PRB may avoid the phenomenon of high data transmission error rate and improve the reliability of service data transmission.

In step 503, the access network device selects first target configuration information from the J types of configuration information.

The access network device can screen out target configuration information required by the target UE from the J types of configuration information, where the target configuration information includes the first target configuration information.

Optionally, the access network device may select the first target configuration information for the target UE from the J types of configuration information according to actual requirements. For example, the access network device may select the first target configuration information for the target UE from the J types of configuration information according to at least one of a service processing state of the target UE, a service change state of the target UE, a network load, and an operating state of the remaining UEs. Since the target UE has selected the first target configuration information from the J types of configuration information, the access network device and the target UE have jointly determined the first target configuration information, then the target UE may transmit the service data based on the first target configuration information.

In step 504, the access network device sends the notification information including the first target configuration information to the target UE.

In the embodiments of the present disclosure, the target UE may also not select the first target configuration information from the J types of configuration information, but sending the notification information including the first target configuration information by the access network device to the target UE.

Optionally, the step 504 may include followings.

The access network device sends the notification information including the first target configuration information to the target UE by using at least one of the RRC protocol, the MAC CE, and the DCI. That is, the access network device may send the notification information including the first target configuration information to the target UE by using the RRC protocol, or may send the notification information including the first target configuration information to the target UE by using the MAC CE, or may send the notification information including the first target configuration information to the target UE by using the DCI, and may also send the notification information including the first target configuration information to the target UE by using more than two of the RRC protocol, the MAC CE, and the DCI.

When the notification information including the first target configuration information is sent by the DCI to the target UE, correspondingly, the access network device may carry the notification information including the first target configuration information in the DCI of the PDCCH. Further, the DCI may include z-bit binary data, z≥1, and the z-bit binary data is used to indicate the resource block allocated by the access network device for the target UE. It is assumed that there are 10 resource blocks to be allocated for all UEs managed by the access network device, and the resource blocks to be allocated for the target UE are the first resource block, the third resource block, the fifth resource block and the sixth resource block of the 10 resource blocks, then z may be equal to 10, the 10-bit binary data may be: 1010110000, the first bit binary data of the 10-bit binary data from left to right is 1, indicating that the first resource block of the 10 resource blocks is allocated for the target UE, the third bit binary data from left to right is 1, indicating that the third resource block of the 10 resource blocks is allocated for the target UE, the fifth bit binary data from left to right is 1, indicating that the fifth resource block of the 10 resource blocks is allocated for the target UE, and the sixth bit binary data from left to right is 1, indicating that the sixth resource block among the 10 resource blocks is allocated for the target UE. Thereafter, the access network device sends the DCI including the z-bit binary data to the target UE. The target UE may also determine the frequency domain position where the resource block allocated for the target UE is located based on the DCI.

Optionally, each type of configuration information includes the first sub-information, correspondingly, after receiving the notification information sent by the access network device and including the first target configuration information, the target UE may determine the number of resource blocks allocated by the access network device for the target UE according to K (that is, the number of PRBs included in the resource block) in the first target configuration information. Thereafter, the target UE determines the frequency domain position where the resource block is located according to the identifier of the resource block in the first target configuration information.

Optionally, the notification information including the first target configuration information includes x-bit binary data and y-bit binary data located after the x-bit binary data, x≥1, y≥1.

The x-bit binary data is used to indicate an identifier of the first target configuration information, and the y-bit binary data is used to indicate an identifier of a resource block allocated for the target UE.

For example, J in the J types of configuration information is equal to 3, the identifier of the first type of configuration information is 1, the identifier of the second type of configuration information is 2, and the identifier of the third type of configuration information is 3. The access network device uses the first type of configuration information as the first target configuration information, the access network device allocates one resource block to the target UE, and the identifier of the resource block is 4. The notification message containing the first target configuration information may then include 6-bit binary data. Since the identifier of the first target configuration information is 1, the identifier of the resource block allocated by the access network device for the target UE is 4, the 6-bit binary data included in the notification message may be 001100, where the first 3 bits of binary data 001 indicates the identifier (i.e., 1) of the first target configuration information, and the last 3 bits of the binary data 100 indicates the identifier (i.e., 4) of the resource block allocated by the access network device for the target UE. There are many manners for adopting the binary data to indicate the identifier of the first target configuration information and the identifier of the resource block allocated by the access network device for the target UE, which is not limited to the manner enumerated herein.

Further, after the step 502, the method further includes: allocating, by the access network device, a resource block used for transmitting service data to the target UE according to information of a resource block included in the target configuration information, the target UE transmitting the service data by using the resource block allocated by the access network device for the target UE.

The target configuration information is configuration information required for the target UE and screened from the J types of configuration information. Optionally, the target configuration information includes the first target configuration information selected in the step 503.

In summary, in the resource allocation method provided by the embodiments in the present disclosure, the access network device obtains the J (J≥1) types of configuration information, and then notifies the J types of configuration information. The access network device or the target UE can screen out the target configuration information required by the target UE from the J types of configuration information, so that the access network device allocates the resource block for the target UE for transmitting the service data. Each type of configuration information includes the information of the resource block to be allocated. Compared with the related art, the content of the configuration information is no longer fixed, so the flexibility of resource allocation is improved.

Figure 6:
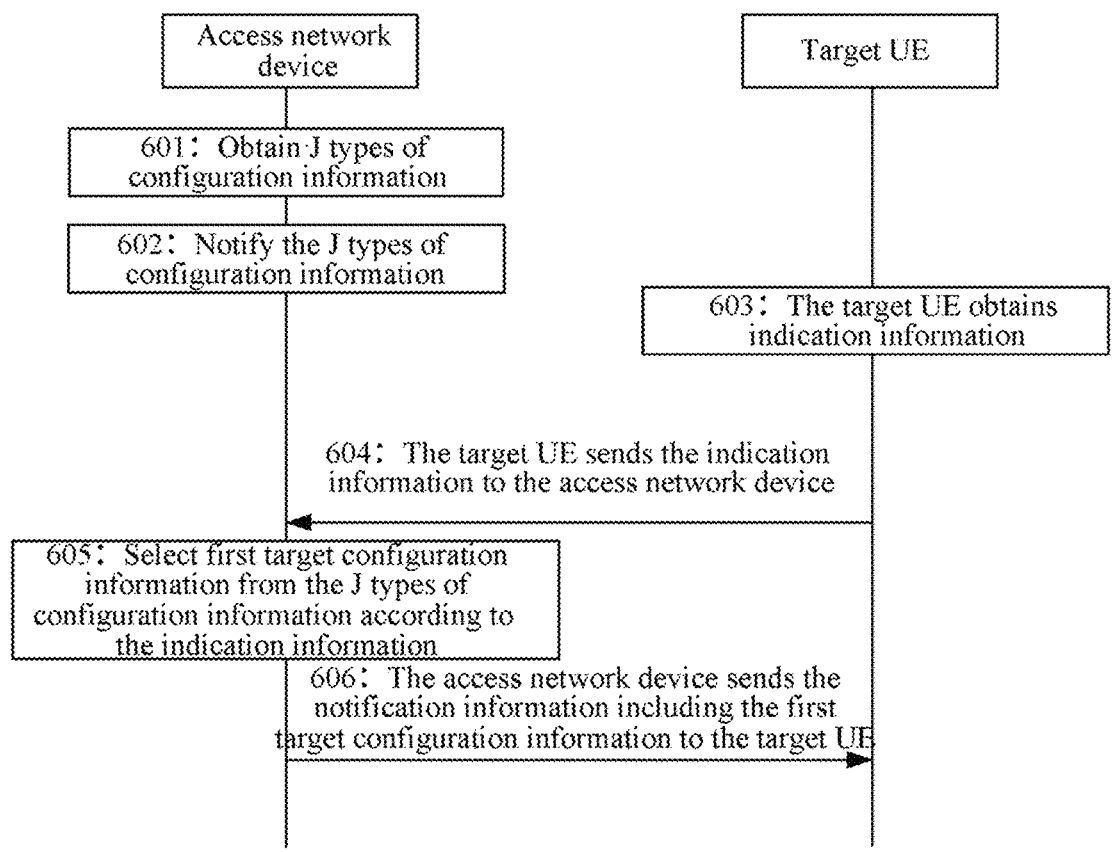
FIG. 6 is a flowchart showing another resource allocation method according to an embodiment of the present disclosure.

The embodiments of the present disclosure provide another resource allocation method, which is applied to the implementation environment shown in FIG. 1. As shown in FIG. 6, the method includes the following steps.

In step 601, the access network device obtains J types of configuration information.

Each type of the configuration information includes information of a resource block to be allocated, J≥1.

The J types of configuration information are predetermined by the access network device according to an allocation policy. For example, the access network device may obtain J types of configuration according to service processing status, network load, and the like of individual UEs managed by the access network device.

In step 602, the access network device notifies the J types of configuration information.

The target configuration information required by the target UE can be screened out from the J types of configuration information. In the embodiments of the present disclosure, the access network device can screen out the target configuration information required by the target UE from the J types of configuration information, and the target UE can also screen out the target configuration information required by the target UE from the J types of configuration information.

Optionally, the access network device may broadcast the J types of configuration information.

For example, the access network device may broadcast the J types of configuration information through at least one of SI and PBCH.

For example, the target UE may select the first target configuration information from the J types of configuration information based on at least one of a device type of the target UE, a service type of a service performed by the target UE, a service level of a service performed by the target UE, a service processing status of the target UE, and a service change status of the target UE. The first target configuration information includes information of a resource block allocated for the target UE for transmitting the service data.

Optionally, each type of the configuration information includes first sub-information or second sub-information.

The first sub-information includes an identifier of a resource block allocated for a target User Equipment (UE) and a number K of Physical Resource Blocks (PRB) included in the resource block, K≥1.

The second sub-information includes a number N of the resource block allocated for the target UE, the identifier of the resource block, and information of the PRB included in the resource block, N≥1. For example, the information of the PRB includes an identifier of the PRB. The PRB included in the resource block in the second sub-information may be discontinuous in the frequency domain.

For example, when the configuration information includes the first sub-information, after receiving the J types of configuration information notified by the access network device, the target UE selects the first target configuration information from the J types of configuration information, and the target UE may determine, according to K (that is, the number of PRBs included in the resource block) in the first target configuration information, the number of resource blocks allocated by the access network device for the target UE; the target UE determines the frequency domain position where the resource block is located according to the identifier of the resource block in the first target configuration information. Further, in order to obtain the mapping manner used for indicating the grouping manner of the PRB, on one hand, the access network device may select one of a plurality of preset mapping manners as the target mapping manner, each mapping manner being used to indicate the grouping manner of the PRB, the access network device then transmits information including the target mapping manner to the target UE. Then, the target UE may determine the information of the PRB included in the resource block allocated by the access network device for itself according to the target mapping manner and the first sub-information. On the other hand, the target UE may determine the information of the PRB included in the resource block allocated by the access network device for the target UE according to a preset mapping manner, and the mapping manner is used to indicate the grouping manner of the PRB.

The specific process of step 602 may refer to the step 502.

In step 603, the target UE obtains the indication information.

The indication information is used to indicate at least one of a device type of the target UE, a service type of the service performed by the target UE, and a service level of the service performed by the target UE. That is, the indication information may be used to indicate the device type of the target UE, the service type of the service performed by the target UE, or the service level of the service performed by the target UE, and may also be used to indicate more than one of the device type of the target UE, the service type of the service performed by the target UE, and the service level of the service performed by the target UE.

For example, the service type of the service performed by the target UE may be smart manufacturing, remote mechanical control, assisted driving or automatic driving. When the service type of the service performed by the target UE is automatic driving, the resource block allocated by the access network device for the target UE needs to include more PRBs; and when the service type of the service performed by the target UE is remote mechanical control, the resource block allocated by the access network device for the target UE may include fewer PRBs.

The device type of the target UE may be used to indicate processing capability of the target UE when processing the service, such as a data transmission rate, a bit error rate, and the like when the target UE processes the service. For example, when the data transmission rate of the target UE is high, the resource block allocated by the access network device for the target UE needs to include more PRBs; and when the data transmission rate of the target UE is low, the resource block allocated by the access network device for the target UE may include fewer PRBs. The UE with a higher data transmission rate may handle service with higher service requirements, such as automatic driving service; and the UE with a lower data transmission rate may handle service with lower service requirements, such as remote mechanical control service.

The service level of the service performed by the target UE is used to indicate a degree of the service requirement of the service, for example, when the service level of the service performed by the target UE is higher, the resource block allocated by the access network device for the target UE needs to include more PRBs; and when the service level of the service performed by the target UE is lower, the resource block allocated by the access network device for the target UE may include fewer PRBs. For example, the service level of the automatic driving service is A, the service level of the remote mechanical control service is B, and the service level indicated by A is higher than the service level indicated by B.

In step 604, the target UE sends indication information to the access network device.

After obtaining the indication information, the target UE sends the indication information to the access network device, so that the access network device may select the target configuration information for the target UE based on the indication information.

In step 605, the access network device selects the first target configuration information from the J types of configuration information according to the indication information.

As is described in the step 602, the target configuration information required by the target UE may be screened out from the J types of configuration information. The target configuration information includes the first target configuration information.

For example, when the indication information is used to indicate that the service type of the service performed by the target UE is automatic driving, the access network device selects the first target configuration information from the J types of configuration information according to the service type, and the resource block in the first target configuration information includes more PRBs.

When the indication information is used to indicate that the service type of the service performed by the target UE is remote mechanical control, the access network device selects the first target configuration information from the J types of configuration information according to the service type, and the resource block in the first target configuration information includes less PRBs.

For example, for the URLLC service, the URLLC service may include various types of service, such as intelligent manufacturing, remote mechanical control, assisted driving, automatic driving and the like. The reliability and delay requirements of each type of service may be different, therefore, the resources allocated by the access network device for the target UE with respect to different types of service are different. In the embodiments of the present disclosure, the access network device may allocate suitable resource to the target UE for different types of service, so as to meet the requirements of the target UE to transmit service data.

In step 606, the access network device sends the notification information including the first target configuration information to the target UE.

Alternatively, the target UE may not select the first target configuration information from the J types of configuration information, instead, the notification information including the first target configuration information is sent by the access network device to the target UE. Optionally, the access network device may send the notification information including the first target configuration information to the target UE by using at least one of the RRC protocol, the MAC CE, and the DCI.

Optionally, each type of configuration information includes the first sub-information, correspondingly, after receiving the notification information sent by the access network device and including the first target configuration information, the target UE may determine the number of resource blocks allocated by the access network device for the target UE according to K (that is, the number of PRBs included in the resource block) in the first target configuration information. Thereafter, the target UE determines the frequency domain position where the resource block is located according to the identifier of the resource block in the first target configuration information.

Optionally, the notification information including the first target configuration information may include x-bit binary data and y-bit binary data located after the x-bit binary data, $x \geq 1$, $y \geq 1$. The x-bit binary data is used to indicate an identifier of the first target configuration information, and the y-bit binary data is used to indicate an identifier of a resource block allocated for the target UE.

Further, after the step 602, the method further includes: allocating, by the access network device, the resource block used for transmitting the service data to the target UE according to information of a resource block included in the target configuration information; and transmitting, by the target UE, the service data by using the resource block allocated by the access network device for the target UE.

The target configuration information is configuration information required by the target UE and screened from the J types of configuration information. Optionally, the target configuration information includes the first target configuration information selected in the step 605.

In summary, in the resource allocation method provided by the embodiments in the present disclosure, the access network device obtains the J ($J \geq 1$) types of configuration information, and then notifies the J types of configuration information. The access network device or the target UE may screen out the target configuration information required by the target UE from the J types of configuration information according to the indication information of the target UE, so that the access network device allocates the resource block for the target UE for transmitting the service data. Each type of configuration information includes the information of the resource block to be allocated, and the indication information may be used to indicate the device type of the target UE, and the like. Compared with the related art, the content of the configuration information is no longer fixed, so the flexibility of resource allocation is improved.

Figure 7:
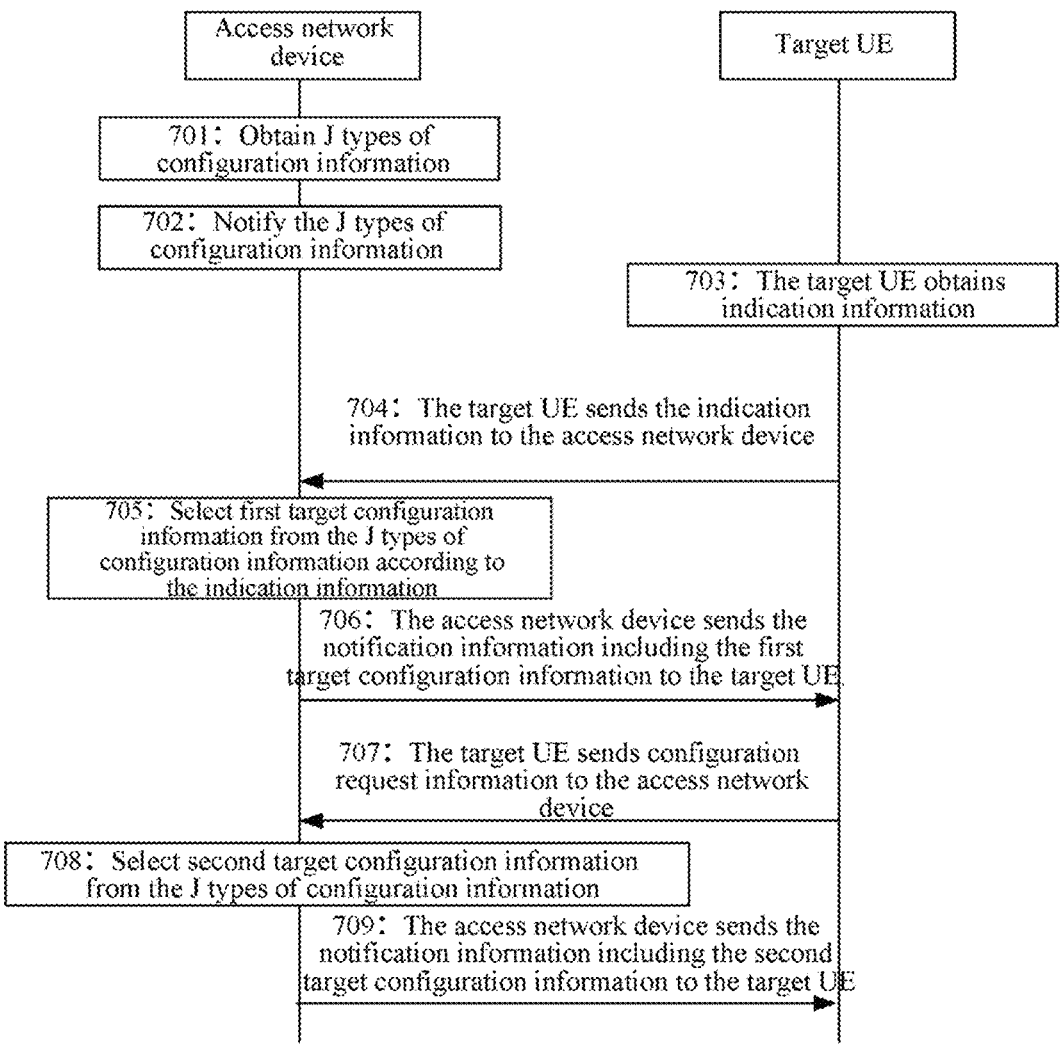
FIG. 7 is a flowchart showing another resource allocation method according to an embodiment of the present disclosure.

The embodiments of the present disclosure provide another resource allocation method, which is applied to the implementation environment shown in FIG. 1. As shown in FIG. 7, the method includes the following steps.

In step 701, the access network device obtains J types of configuration information.

Each type of the configuration information includes information of a resource block to be allocated, J≥1.

The specific process of step 701 may be referred to the step 501.

In step 702, the access network device notifies the J types of configuration information.

The target configuration information required by the target UE may be screened out from the J types of configuration information.

Optionally, the access network device may broadcast the J types of configuration information.

For example, the access network device may broadcast the J types of configuration information through at least one of SI and PBCH.

For example, the target UE may select the first target configuration information from the J types of configuration information based on at least one of a device type of the target UE, a service type of a service performed by the target UE, a service level of a service performed by the target UE, a service processing status of the target UE, and a service change status of the target UE. The first target configuration information includes information of a resource block allocated for the target UE for transmitting the service data.

Optionally, each type of the configuration information includes first sub-information or second sub-information.

The first sub-information includes an identifier of a resource block allocated for a target User Equipment (UE) and a number K of Physical Resource Blocks (PRB) included in the resource block, K≥1.

The second sub-information includes a number N of the resource block allocated for the target UE, the identifier of the resource block, and information of the PRB included in the resource block, N≥1. For example, the information of the PRB includes an identifier of the PRB. The PRB included in the resource block in the second sub-information may be discontinuous in the frequency domain.

For example, when the configuration information includes the first sub-information, after receiving the J types of configuration information notified by the access network device, the target UE may determine, according to K (that is, the number of PRBs included in the resource block) in the first target configuration information, the number of resource blocks allocated by the access network device for the target UE; and the target UE determines the frequency domain position where the resource block is located according to the identifier of the resource block in the first target configuration information. Further, in order to obtain the mapping manner used for indicating the grouping manner of the PRB, on one hand, the access network device may select one of a plurality of preset mapping manners as the target mapping manner, each mapping manner being used to indicate the grouping manner of the PRB, the access network device then transmits information including the target mapping manner to the target UE. Then, the target UE may determine the information of the PRB included in the resource block allocated by the access network device for itself according to the target mapping manner and the first sub-information. On the other hand, the target UE may determine the information of the PRB included in the resource block allocated by the access network device for the target UE according to a preset mapping manner, and the mapping manner is used to indicate the grouping manner of the PRB.

The specific process of step 702 may refer to the step 502.

In step 703, the target UE obtains the indication information.

The indication information is used to indicate at least one of a device type of the target UE, a service type of the service performed by the target UE, and a service level of the service performed by the target UE.

The specific process of step 703 may refer to the step 603.

In step 704, the target UE sends the indication information to the access network device.

After obtaining the indication information, the target UE sends the indication information to the access network device, so that the access network device may select the target configuration information for the target UE based on the indication information.

In step 705, the access network device selects the first target configuration information from the J types of configuration information according to the indication information.

In step 706, the access network device sends the notification information including the first target configuration information to the target UE.

Alternatively, the target UE may not select the first target configuration information from the J types of configuration information, instead, the notification information including the first target configuration information is sent by the access network device to the target UE. Optionally, the access network device may send the notification information including the first target configuration information to the target UE by using at least one of the RRC protocol, the MAC CE, and the DCI.

Optionally, each type of configuration information includes the first sub-information, correspondingly, after the target UE receives the notification information sent by the access network device and including the first target configuration information, the method further includes:

determining, by the target UE, the number of resource blocks allocated by the access network device for the target UE according to K (that is, the number of PRBs included in the resource block) in the first target configuration information; determining, by the target UE, the frequency domain position where the resource block is located according to the identifier of the resource block in the first target configuration information.

Optionally, the notification information including the first target configuration information includes x-bit binary data and y-bit binary data located after the x-bit binary data, x≥1, y≥1. The x-bit binary data is used to indicate an identifier of the first target configuration information, the y-bit binary data is used to indicate an identifier of a resource block allocated for the target UE.

Further, the method further includes: allocating, by the access network device, the resource block used for transmitting the service data to the target UE according to information of a resource block included in the target configuration information; and transmitting, by the target UE, the service data by using the resource block allocated by the access network device for the target UE.

In step 707, the target UE sends the configuration request information to the access network device.

During the process of the service, it is possible that the service cannot meet the corresponding service requirements due to the influence by factors such as environmental changes. In order to meet the service requirements, it is necessary to flexibly adjust the target configuration information required by the target UE screened out from the J types of configuration information.

Optionally, in the embodiments of the present disclosure, the target UE may detect, according to at least one of the service processing state and the service change state of the target UE, whether the resource block indicated by the first target configuration information meets a preset configuration condition. For example, if the resource block included in the first target configuration information may transmit the service data, the resource block indicated by the first target configuration information meets the preset configuration condition. If the resource block included in the first target configuration information cannot transmit the service data, or the reliability of transmitting service data is low, the resource block indicated by the first target configuration information does not meet the preset configuration condition.

When the resource block indicated by the first target configuration information does not meet the preset configuration condition, the target UE may generate the configuration request information, or directly select the second target configuration information from the received J types of configuration information notified by the access network device. As is described in the step 702, the target configuration information required by the target UE may be screened out from the J types of configuration information, and the target configuration information includes the second target configuration information.

When generating configuration request information, the target UE sends the configuration request information to the access network device. The configuration request information is used to request the access network device to select the second target configuration information from the J types of configuration information. The second target configuration information is different from the first target configuration information. That is, the configuration request information is used to request the access network device to select another target configuration information different from the first target configuration information from the J types of configuration information.

Therefore, when the access network device receives the configuration request information sent by the target UE, the access network device may determine that the resource block indicated by the first target configuration information does not meet the preset configuration condition, and it is needed to select another target configuration information from the J types of configuration information.

In addition, in the embodiments of the present disclosure, the access network device may also detect, according to at least one of the service processing state of the target UE, the service change state of the target UE, the network load, and the operating state of the remaining UEs, whether the resource block indicated by the first target configuration information meets the preset configuration condition. When the resource block indicated by the first target configuration information meets the preset configuration condition, the access network device selects the second target configuration information from the J types of configuration information.

In step 708, the access network device selects the second target configuration information from the J types of configuration information.

For example, the service performed by the target UE is changed from the first type of service to the second type of service, and the second type of service has higher service requirement than the first type of service, therefore, the number of PRBs included in the resource block in the second target configuration information selected by the access network device from the J types of configuration information should be greater than the number of PRBs included in the first target configuration information previously selected.

It should be noted that the step 708 and the step 706 have no sequence, and the step 708 may also be performed before the step 706.

In step 709, the access network device sends the notification information including the second target configuration information to the target UE.

Alternatively, the target UE may not select the second target configuration information from the J types of configuration information, instead, the notification information including the second target configuration information is sent by the access network device to the target UE. Optionally, the access network device may send the notification information including the second target configuration information to the target UE by using at least one of the RRC protocol, the MAC CE, and the DCI.

Optionally, each type of configuration information includes the first sub-information, correspondingly, after receiving the notification information sent by the access network device and including the second target configuration information, the target UE may determine the number of resource blocks allocated by the access network device for the target UE according to K (that is, the number of PRBs included in the resource block) in the second target configuration information. Thereafter, the target UE determines the frequency domain position where the resource block is located according to the identifier of the resource block in the second target configuration information.

Optionally, the notification information including the second target configuration information includes x-bit binary data and y-bit binary data located after the x-bit binary data, x≥1, x≥1. The x-bit binary data is used to indicate an identifier of the second target configuration information, and the y-bit binary data is used to indicate an identifier of a resource block allocated for the target UE.

Further, the method further includes: allocating, by the access network device, the resource block used for transmitting the service data to the target UE according to information of a resource block included in the second target configuration information; and transmitting, by the target UE, the service data by using the resource block allocated by the access network device for the target UE.

In summary, in the resource allocation method provided by the embodiments in the present disclosure, the access network device obtains the J (J≥1) types of configuration information, and then notifies the J types of configuration information. The access network device or the target UE may flexibly adjust the target configuration information required by the target UE and screened out from the J types of configuration information in the process of the service to meet the requirement of the target UE to transmit the service data. Each type of configuration information includes the information of the resource block to be allocated. Compared with the related art, the content of the configuration information is no longer fixed, so the flexibility of resource allocation is improved.

It should be noted that the sequence of the steps of the resource allocation method provided by the embodiments of the present disclosure may be appropriately adjusted. For example, the step 708 may be performed before the step 706, and the steps may also be correspondingly increased or decreased according to the situation. Any method that may be easily conceived by those skilled in the art within the technical scope disclosed in the present disclosure is intended to be included in the protection scope of the present disclosure, and therefore will not be elaborated again.

Figure 8A:
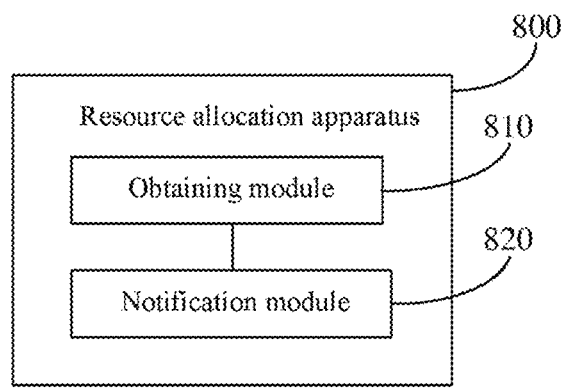
FIG. 8A is a schematic diagram showing a resource allocation apparatus according to an embodiment of the present disclosure.

The embodiments of the present disclosure provide a resource allocation apparatus 800, which is applied to the access network device 01 in the implementation environment shown in FIG. 1. As shown in FIG. 8A, the apparatus 800 includes:

an obtaining module 810, configured to obtain J types of configuration information, each type of the configuration information including information of a resource block to be allocated, J≥1; and a notification module 820, configured to notify the J types of configuration information.

In summary, in the resource allocation apparatus provided by the embodiments in the present disclosure, the access network device obtains the J (J≥1) types of configuration information, and then notifies the J types of configuration information. Each type of configuration information includes the information of the resource block to be allocated, and the target configuration information required by the target UE may be screened out from the J types of configuration information. Compared with the related art, the content of the configuration information is no longer fixed, so the flexibility of resource allocation is improved.

Figure 8B:
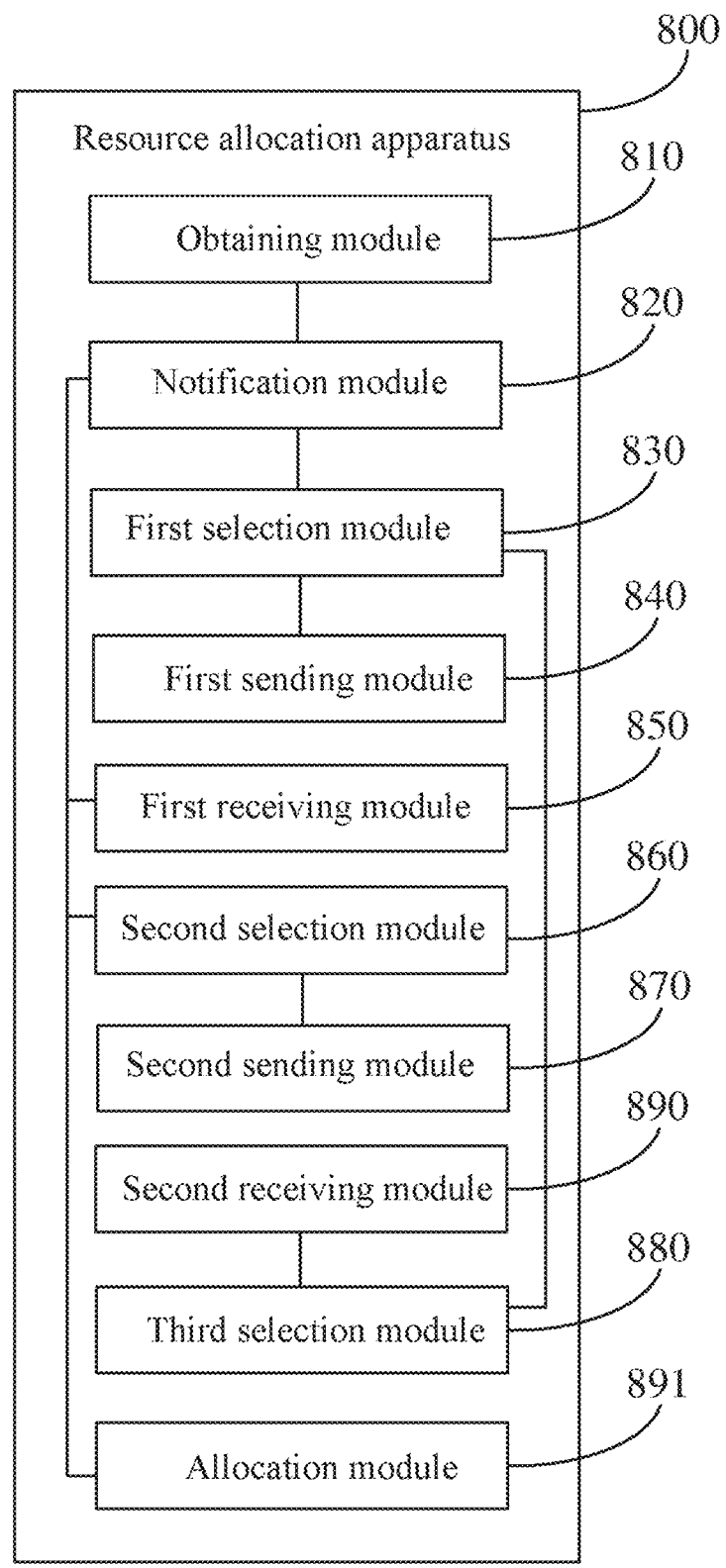
FIG. 8B is a schematic diagram showing another resource allocation apparatus according to an embodiment of the present disclosure.

Further, as shown in FIG. 8B, the apparatus 800 includes:

a first selection module 830, configured to select first target configuration information from the J types of configuration information, the first target configuration information including information of a resource block allocated for a target UE for transmitting service data; and a first sending module 840, configured to send notification information including the first target configuration information to the target UE.

Further, as shown in FIG. 8B, the apparatus 800 includes:

a first receiving module 850, configured to receive indication information sent by the target UE, the indication information being used to indicate at least one of a device type of the target UE, a service type of a service performed by the target UE, and a service level of a service performed by the target UE.

Corresponding, the first selection module 830 is configured to:

select the first target configuration information from the J types of configuration information according to the indication information.

Optionally, each type of the configuration information includes first sub-information or second sub-information, the first sub-information includes an identifier of a resource block allocated for a target UE and a number K of Physical Resource Blocks (PRB) included in the resource block, K≥1, and the second sub-information includes a number N of the resource block allocated for the target UE, the identifier of the resource block, and information of the PRB included in the resource block, N≥1.

The each type of configuration information includes the first sub-information. Further, as shown in FIG. 8B, the apparatus 800 further includes:

a second selection module 860, configured to select one of a plurality of preset mapping manners as a target mapping manner, each of the mapping manners being used to indicate a grouping manner of the PRB; and a second sending module 870, configured to send information including the target mapping manner to the target UE.

Optionally, J≥2, the apparatus 800 further includes:

a third selection module 880, configured to select second target configuration information from the J types of configuration information, the second target configuration information being different from the first target configuration information.

The first sending module 840 is further configured to send notification information including the second target configuration information to the target UE.

Further, as shown in FIG. 8B, the apparatus 800 includes:

a second receiving module 890, configured to receive configuration request information sent by the target UE, the configuration request information being used to request the access network device to select the second target configuration information from the J types of configuration information.

Optionally, the notification information includes x-bit binary data and y-bit binary data located after the x-bit binary data, x≥1, y≥1.

The x-bit binary data is used to indicate an identity of the first target configuration information or the second target configuration information, the y-bit binary data is used to indicate an identity of a resource block allocated for the target UE.

Optionally, the notification module 820 is configured to:

notify the J types of configuration information by at least one of System Information (SI), a Radio Resource Control (RRC) protocol, a Medium Access Control (MAC) Channel Element (CE), Downlink Control Information (DCI), and a Physical Broadcast Channel (PBCH).

Optionally, the first sending module 840 is configured to:

send the notification information including the target configuration information to the target UE by using at least one of the RRC protocol, the MAC CE and the DCI, the target configuration information including the first target configuration information or the second target configuration information, the second target configuration information being selected by the access network device from the J types of configuration information, and the second target configuration information being different from the first target configuration information.

Optionally, the information of the PRB includes an identity of the PRB.

Further, as shown in FIG. 8B, the apparatus 800 includes:

an allocation module 891, configured to allocate a resource block used for transmitting service data to the target User Equipment (UE) according to information of a resource block included in the target configuration information, the target configuration information being configuration information required by the target UE and screened from the J types of configuration information. The meanings of other reference signs in FIG. 8B may refer to FIG. 8A.

In summary, in the resource allocation apparatus provided by the embodiments in the present disclosure, the access network device obtains the J (J≥1) types of configuration information, and then notifies the J types of configuration information. The access network device or the target UE may screen out the target configuration information required by the target UE from the J types of configuration information. The access network device or the target UE may flexibly adjust the target configuration information required by the target UE and screened out from the J types of configuration information in the process of the service to meet the requirement of the target UE to transmit the service data. Each type of configuration information includes the information of the resource block to be allocated. Compared with the related art, the content of the configuration information is no longer fixed, so the flexibility of resource allocation is improved.

Figure 9A:
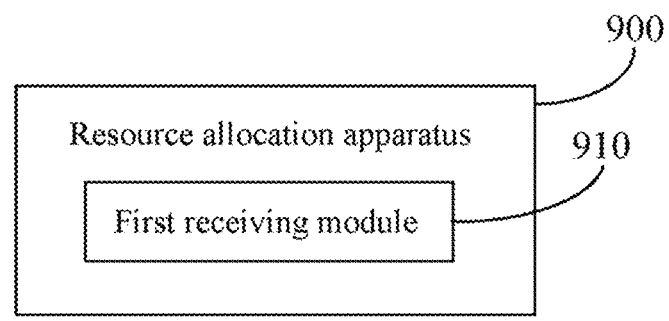
FIG. 9A is a schematic diagram showing a resource allocation apparatus according to an embodiment of the present disclosure.

The embodiments of the present disclosure provide a resource allocation apparatus 900, which is applied to the target UE02 in the implementation environment shown in FIG. 1. As shown in FIG. 9A, the apparatus 900 includes:

a first receiving module 910, configured to receive J types of configuration information notified by an access network device, the J types of configuration information being acquired by the access network device in advance, and each of the configuration information including information of a resource block to be allocated, J≥1.

In summary, in the resource allocation apparatus provided by the embodiments of the present disclosure, the target UE may receive the J (J≥1) types of configuration information notified by the access network device. The J types of configuration information is obtained in advance by the access network device, each configuration information includes information of the resource block to be allocated, and the target configuration information required by the target UE may be screened out from the J types of configuration information. Compared with the related art, the content of the configuration information is no longer fixed, so the flexibility of resource allocation is improved.

Figure 9B:
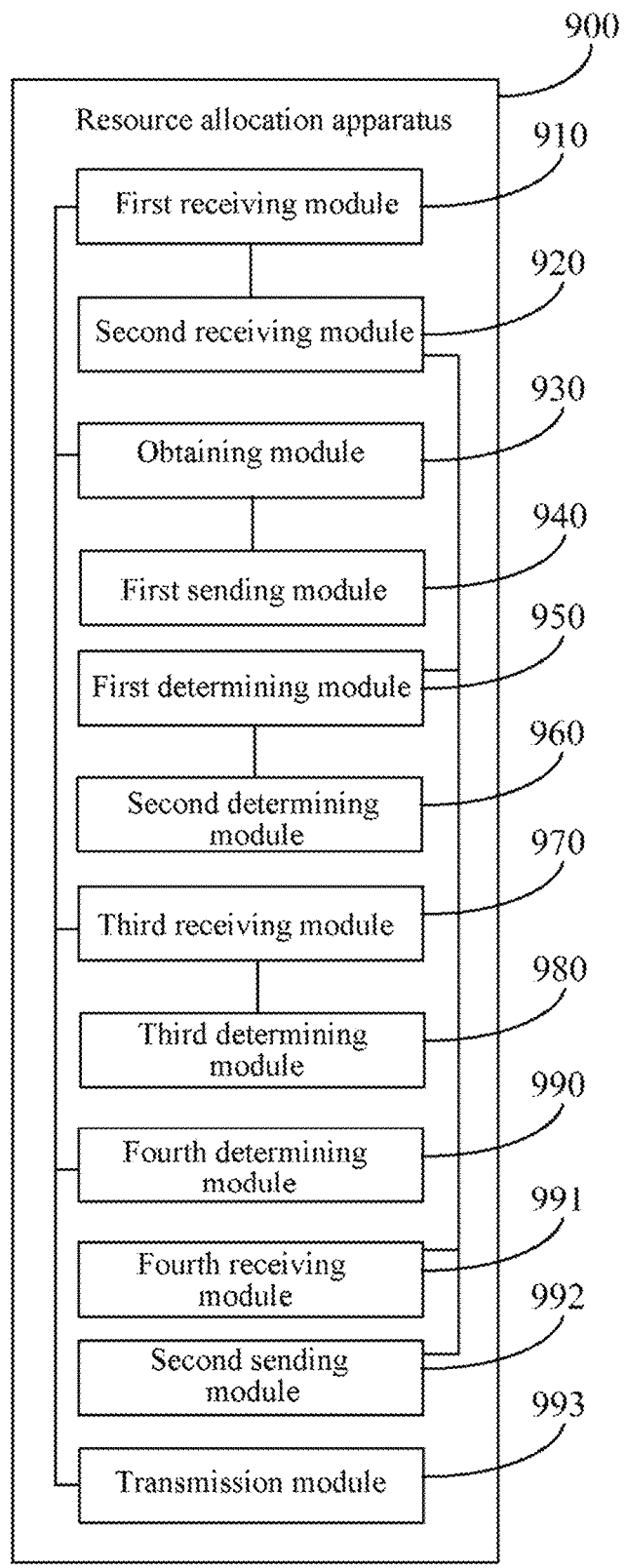
FIG. 9B is a schematic diagram showing another resource allocation apparatus according to an embodiment of the present disclosure.

Further, as shown in FIG. 9B, the apparatus 900 further includes:

a second receiving module 920, configured to receive notification information including first target configuration information and sent by the access network device, the first target configuration information being selected by the access network device from the J types of configuration information, the first target configuration information including information of a resource block allocated for the target UE for transmitting service data.

Further, as shown in FIG. 9B, the apparatus 900 further includes:

an obtaining module 930, configured to obtain indication information, the indication information being used to indicate at least one of a device type of the target UE, a service type of a service performed by the target UE, and a service level of a service performed by the target UE; and a first sending module 940, configured to send the indication information to the access network device.

Optionally, each type of the configuration information includes first sub-information or second sub-information, the first sub-information includes an identifier of a resource block allocated for a target UE and a number K of Physical Resource Blocks (PRB) included in the resource block, K≥1, and the second sub-information includes a number N of the resource block allocated for the target UE, the identifier of the resource block, and information of the PRB included in the resource block, N≥1.

Optionally, each type of the configuration information includes the first sub-information, further, as shown in FIG. 9B, the apparatus 900 further includes:

a first determining module 950, configured to determine, according to the K in target configuration information, the number of resource blocks allocated by the access network device for the target UE, the target configuration information being configuration information required by the target UE and screened from the J types of configuration information; and a second determining module 960, configured to determine a frequency domain position where the resource block is located according to an identity of a resource block in the target configuration information.

Optionally, each of the configuration information includes the first sub-information, further, as shown in FIG. 9B, the apparatus 900 further includes:

a third receiving module 970, configured to receive, information including a target mapping manner and sent by the access network device, the target mapping manner being selected by the access network device from a plurality of preset mapping manners, each of the mapping manners being used to indicate a grouping manner of the PRB; and a third determining module 980, configured to determine information of the PRB included in the resource block allocated by the access network device for itself according to the target mapping manner and the first sub-information.

Optionally, each of the configuration information includes the first sub-information, further, as shown in FIG. 9B, the apparatus 900 further includes:

a fourth determining module 990, configured to determine information of the PRB included in the resource block allocated by the access network device for the target UE according to a preset mapping manner, the mapping manner being used to indicate a grouping manner of the PRB.

Optionally, J≥2, further, as shown in FIG. 9B, the apparatus 900 further includes:

a fourth receiving module 991, configured to receive notification information including second target configuration information and sent by the access network device, the second target configuration information being selected by the access network device from the J types of configuration information, the second target configuration information being different from the first target configuration information.

Further, as shown in FIG. 9B, the apparatus 900 further includes:

a second sending module 992, configured to send configuration request information to the access network device, the configuration request information being used to request the access network device to select the second target configuration information from the J types of configuration information.

Optionally, the notification information includes x-bit binary data and y-bit binary data located after the x-bit binary data, x≥1, y≥1, wherein, the x-bit binary data is used to indicate an identity of the first target configuration information or the second target configuration information, the y-bit binary data is used to indicate an identity of a resource block allocated for the target UE.

Further, as shown in FIG. 9B, the apparatus 900 further includes:

a transmission module 993, configured to transmit service data by adopting the resource block allocated by the access network device for the target UE according to the information of the resource block included in the target configuration information, the target configuration information being configuration information required by the target UE and screened from the J types of configuration information. The meanings of other reference signs in FIG. 9B may refer to FIG. 9A.

In summary, in the resource allocation apparatus provided by the embodiments in the present disclosure, the access network device obtains the J (J≥1) types of configuration information, and then notifies the J types of configuration information. The access network device or the target UE may screen out the target configuration information required by the target UE from the J types of configuration information. The access network device or the target UE may flexibly adjust the target configuration information required by the target UE and screened out from the J types of configuration information in the process of the service to meet the requirement of the target UE to transmit the service data. Each type of configuration information includes the information of the resource block to be allocated. Compared with the related art, the content of the configuration information is no longer fixed, so the flexibility of resource allocation is improved.

Figure 10:
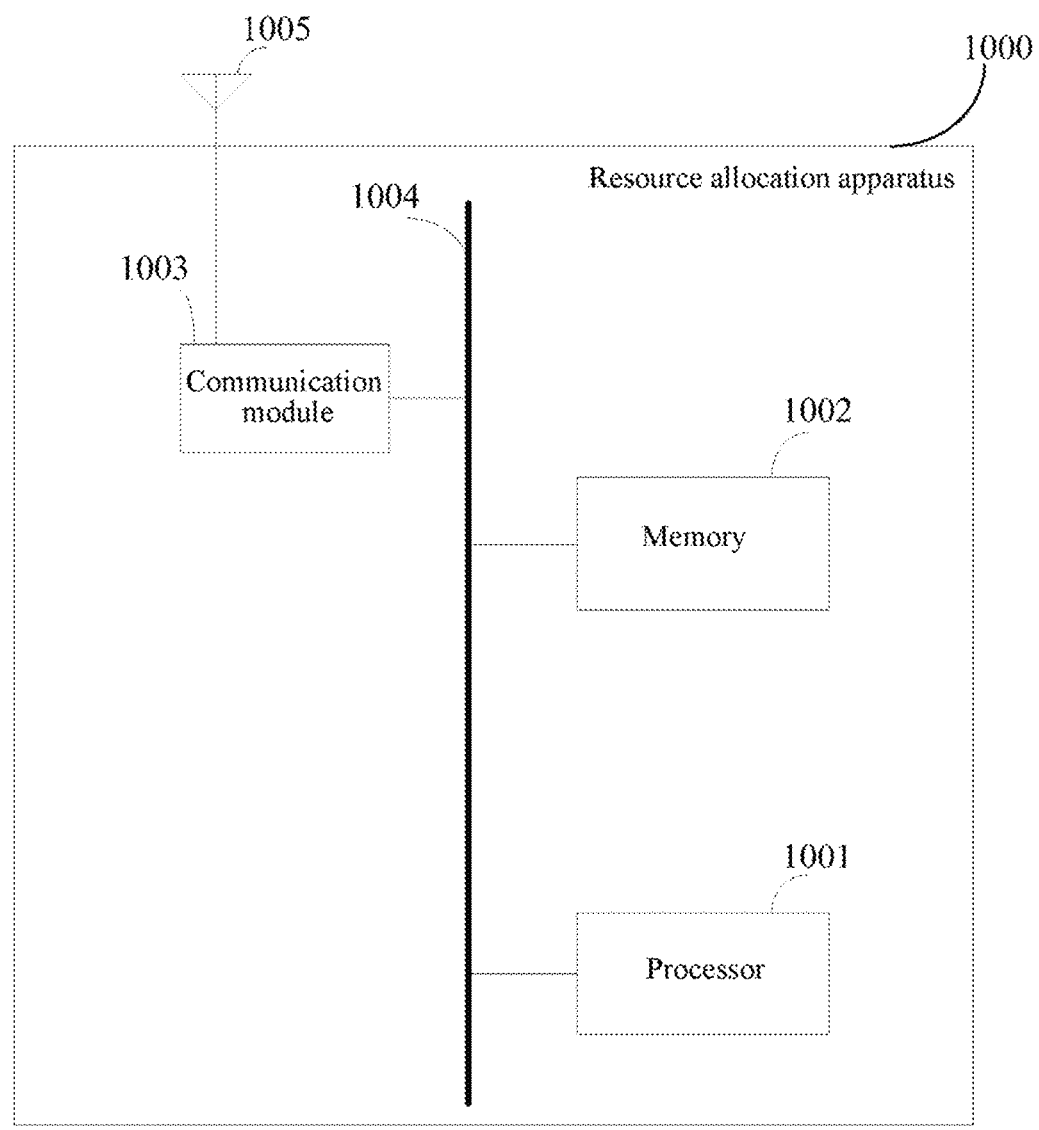
FIG. 10 is a schematic diagram showing another resource allocation apparatus according to an embodiment of the present disclosure.

FIG. 10 is a schematic diagram showing another resource allocation apparatus according to an embodiment of the present disclosure. The apparatus is applied to the access network device. It should be understood that the apparatus may have more or fewer components than shown in FIG. 10, may combine two or more components, or may have different component configuration. The various components shown in FIG. 10 may be implemented in hardware including one or more signal processing and/or application specific integrated circuits, software, or a combination of hardware and software. The resource allocation apparatus shown in FIG. 10 will now be specifically described as an example. As shown in FIG. 10, the resource allocation apparatus includes at least one processor 1001, a memory 1002, a communication module 1003, at least one communication bus 1004, and a communication antenna 1005. The resource allocation apparatus also includes other functional components such as a battery module, a wired/wireless charging structure, and the like. The communication bus 1004 is used to implement connection communication between these components. The memory 1002 may include a non-volatile solid state memory and/or a dynamic non-volatile storage device such as a flash memory and a rotatable disk drive. The communication module 1003 may be used for long-distance communication, such as Global System For Mobile Communications (GSM), Code Division Multiple Access (CDMA), General Packet Radio Service (GPRS), Enhanced Data Rate for GSM Evolution (EDGE), 3G technology such as Wideband Code Division Multiple Access (WCDMA), Time Division-Synchronous Code Division Multiple Access (TD-SCDMA), 4G technology such as LTE, 5G technology, etc. The communication antenna 1005 is used to receive and transmit a communication signal.

Specifically, the memory 1002 includes an operating system and an application. The operating system includes various operating system programs for implementing various hardware-based operations; the application includes various applications for implementing various application functions.

The processor 1001 communicates with various modules and components through the communication bus 1004. The processor 1001 may perform an application stored in the memory 1002 to implement the access network device, so that the access network device implements the resource allocation method, and the method includes:

obtaining J types of configuration information, each type of the configuration information including information of a resource block to be allocated, J≥1; and notifying the J types of configuration information.

Optionally, after the notifying the J types of configuration information, the method further includes:

selecting first target configuration information from the J types of configuration information, the first target configuration information including information of a resource block allocated for a target User Equipment (UE) for transmitting service data; and sending notification information including the first target configuration information to the target UE.

Optionally, after the notifying the J types of configuration information, the method further includes:

receiving indication information sent by the target UE, the indication information being used to indicate at least one of a device type of the target UE, a service type of a service performed by the target UE, and a service level of a service performed by the target UE;

the selecting the first target configuration information from the J types of configuration information includes:

selecting the first target configuration information from the J types of configuration information according to the indication information.

Optionally, each type of the configuration information includes first sub-information or second sub-information, the first sub-information includes an identifier of a resource block allocated for a target UE and a number K of Physical Resource Blocks (PRB) included in the resource block, K≥1, and the second sub-information includes a number N of the resource block allocated for the target UE, the identifier of the resource block, and information of the PRB included in the resource block, N≥1.

Optionally, each type of the configuration information includes the first sub-information, and after the notifying the J types of configuration information, the method further includes:

selecting one of a plurality of preset mapping manners as a target mapping manner, each of the mapping manners being used to indicate a grouping manner of the PRB; and sending information including the target mapping manner to the target UE.

Optionally, J≥2, after the selecting first target configuration information from the J types of configuration information, the method further includes:

selecting second target configuration information from the J types of configuration information, the second target configuration information being different from the first target configuration information; and sending notification information including the second target configuration information to the target UE.

Optionally, before the selecting the second target configuration information from the J types of configuration information, the method further includes:

receiving configuration request information sent by the target UE, the configuration request information being used to request the access network device to select the second target configuration information from the J types of configuration information.

Optionally, the notification information includes x-bit binary data and y-bit binary data located after the x-bit binary data, x≥1, y≥1, wherein, the x-bit binary data is used to indicate an identity of the first target configuration information or the second target configuration information, the y-bit binary data is used to indicate an identity of a resource block allocated for the target UE.

Optionally, the notifying the J types of configuration information includes:

notifying the J types of configuration information by at least one of System Information (SI), a Radio Resource Control (RRC) protocol, a Medium Access Control (MAC) Channel Element (CE), Downlink Control Information (DCI), and a Physical Broadcast Channel (PBCH).

Optionally, sending the notification information including the target configuration information to the target UE includes:

sending the notification information including the target configuration information to the target UE by using at least one of an RRC protocol, a MAC CE and a DCI, the target configuration information including the first target configuration information or the second target configuration information.

Optionally, the information of the PRB includes an identity of the PRB.

Optionally, after the notifying the J types of configuration information, the method further includes:

allocating a resource block used for transmitting service data to the target User Equipment (UE) according to information of a resource block included in the target configuration information, the target configuration information being configuration information required by the target UE and screened from the J types of configuration information.

The resource allocation apparatus provided by the embodiments of the present disclosure implements the method embodiments shown in FIG. 3, FIG. 5, FIG. 6 or FIG. 7, and the functions and steps performed by the access network device in the apparatus embodiments shown in FIG. 8A or FIG. 8B by a cooperation of foregoing various execution modules. For example, the obtaining module 810 in FIG. 8A in the above may be implemented by an application stored in the memory 1002 performed by the processor 1001; the first transmitting module 840 in FIG. 8B may be implemented by the communication module 1003 and the communication antenna 1005.

In summary, in the resource allocation apparatus provided by the embodiments in the present disclosure, the access network device obtains the J (J≥1) types of configuration information, and then notifies the J types of configuration information. The access network device or the target UE may screen out the target configuration information required by the target UE from the J types of configuration information. The access network device or the target UE may flexibly adjust the target configuration information required by the target UE and screened out from the J types of configuration information in the process of the service to meet the requirement of the target UE to transmit the service data. Each type of configuration information includes the information of the resource block to be allocated. Compared with the related art, the content of the configuration information is no longer fixed, so the flexibility of resource allocation is improved.

Figure 11:
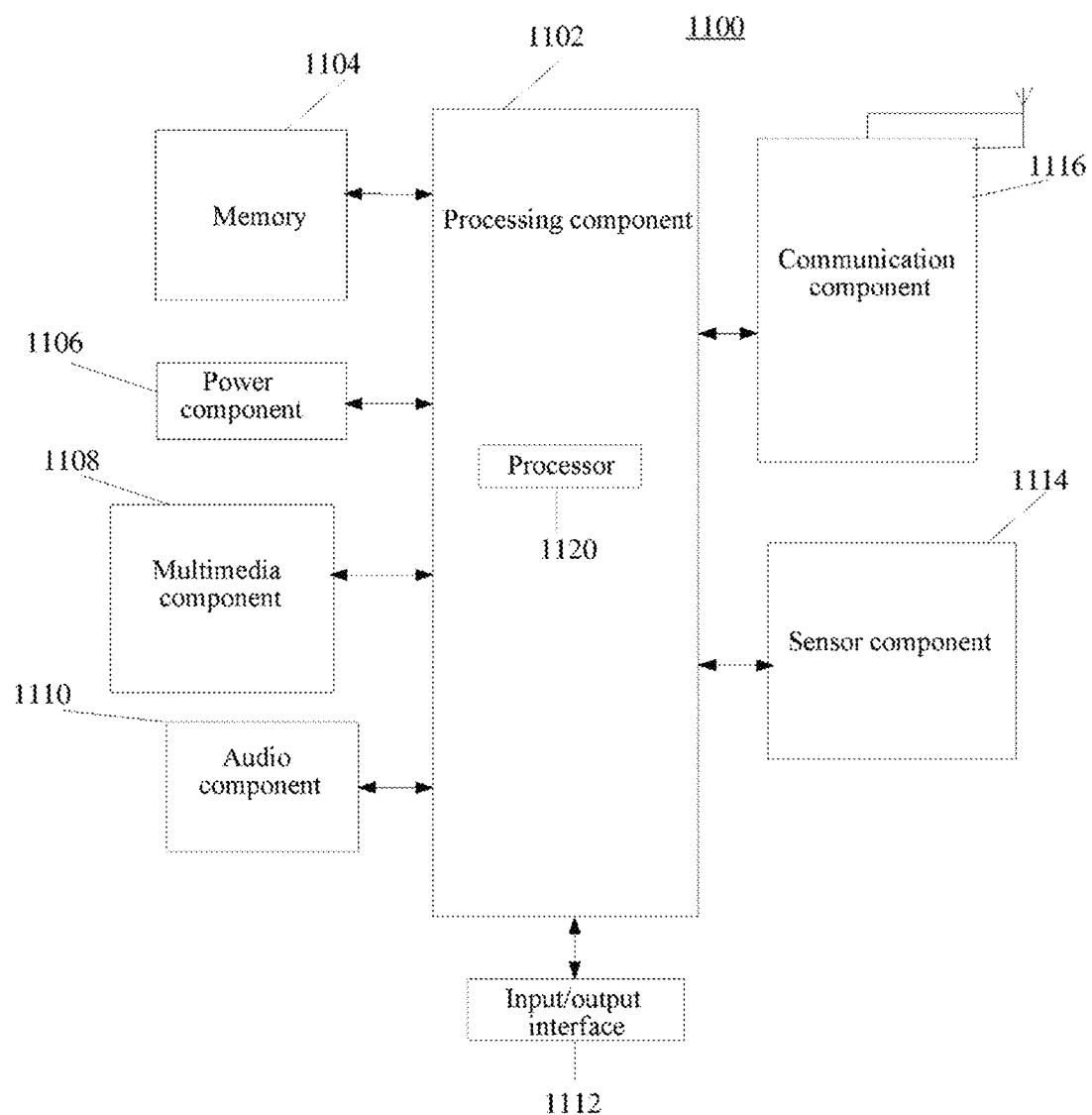
FIG. 11 is a schematic diagram showing another resource allocation apparatus according to an embodiment of the present disclosure.

FIG. 11 is a schematic diagram showing another resource allocation apparatus according to an embodiment of the present disclosure. For example, the apparatus 1100 may be a mobile phone, a computer, a digital broadcast terminal, a messaging device, a gaming console, a tablet device, a medical device, a fitness device, a personal digital assistant, and the like.

Referring to FIG. 11, the apparatus 1100 may include one or more of following components: a processing component 1102, a memory 1104, a power component 1106, a multimedia component 1108, an audio component 1110, an input/output (I/O) interface 1112, a sensor component 1114, and a communication component 1116.

The processing component 1102 typically controls an overall operation of the apparatus 1100, such as operations associated with display, telephone calls, data communications, camera operations, and recording operations. The processing component 1102 may include one or more processors 1120 to execute instructions to perform all or part of the steps of the above described methods. Moreover, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operation on the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like.

The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, 3G, 4G, or 5G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer readable storage medium including instructions, such as the memory 1104 including instructions, and the instructions may be performed by the processor 1120 of the apparatus 1100 to perform the methods above. For example, the non-transitory computer readable storage medium may be a ROM, a Random Access Memory (RAM), a CD-ROM, a magnetic tape, a floppy disk, an optical data storage device, and the like.

A non-transitory computer readable storage medium, when instructions in the storage medium are performed by the processor of the apparatus 1100, enables the apparatus 1100 to perform a resource allocation method, including:

receiving J types of configuration information notified by an access network device, the J types of configuration information being acquired by the access network device in advance, and each of the configuration information including information of a resource block to be allocated, $J \geq 1$.

Optionally, after the receiving the J types of configuration information notified by the access network device, the method further includes:

receiving notification information including first target configuration information and sent by the access network device, the first target configuration information being selected by the access network device from the J types of configuration information, the first target configuration information including information of a resource block allocated for the target UE for transmitting service data.

Optionally, after the receiving the J types of configuration information notified by the access network device, the method further includes:

obtaining indication information, the indication information being used to indicate at least one of a device type of the target UE, a service type of a service performed by the target UE, and a service level of a service performed by the target UE; and sending the indication information to the access network device.

Optionally, each type of the configuration information includes first sub-information or second sub-information, the first sub-information includes an identifier of a resource block allocated for a target UE and a number K of Physical Resource Blocks (PRB) included in the resource block, $K \geq 1$, and the second sub-information includes a number N of the resource block allocated for the target UE, the identifier of the resource block, and information of the PRB included in the resource block, $N \geq 1$.

Optionally, each type of the configuration information includes the first sub-information, after the receiving the J types of configuration information notified by the access network device, the method further includes:

determining, according to the K in target configuration information, the number of resource blocks allocated by the access network device for the target UE, the target configuration information being configuration information required by the target UE and filtered from the J types of configuration information; and determining a frequency domain position where the resource block is located according to an identity of a resource block in the target configuration information.

Optionally, each of the configuration information includes the first sub-information, after the receiving the J types of configuration information notified by the access network device, the method further includes:

receiving, information including a target mapping manner and sent by the access network device, the target mapping manner being selected by the access network device from a plurality of preset mapping manners, each of the mapping manners being used to indicate a grouping manner of the PRB; and determining information of the PRB included in the resource block allocated by the access network device for itself according to the target mapping manner and the first sub-information.

Optionally, each of the configuration information includes the first sub-information, after the receiving the J types of configuration information notified by the access network device, the method further includes:

determining information of the PRB included in the resource block allocated by the access network device for the target UE according to a preset mapping manner, the mapping manner being used to indicate a grouping manner of the PRB.

Optionally, $J \geq 2$, after the receiving the notification information including the first target configuration information and sent by the access network device, the method further includes:

receiving notification information including second target configuration information and sent by the access network device, the second target configuration information being selected by the access network device from the J types of configuration information, the second target configuration information being different from the first target configuration information.

Optionally, after the receiving the notification information including the first target configuration information and sent by the access network device, the method further includes:

sending configuration request information to the access network device, the configuration request information being used to request the access network device to select the second target configuration information from the J types of configuration information.

Optionally, the notification information includes x-bit binary data and y-bit binary data located after the x-bit binary data, x≥1, y≥1, wherein, the x-bit binary data is used to indicate an identity of the first target configuration information or the second target configuration information, the y-bit binary data is used to indicate an identity of a resource block allocated for the target UE.

Optionally, after the receiving the J types of configuration information notified by the access network device, the method further includes:

transmitting service data by adopting the resource block allocated by the access network device for the target UE according to the information of the resource block included in the target configuration information, the target configuration information being configuration information required by the target UE and screened from the J types of configuration information.

The resource allocation apparatus provided by the embodiments of the present disclosure implements the method embodiments shown in FIG. 4, FIG. 5, FIG. 6 or FIG. 7, and the functions and steps performed by the access network device in the device embodiments shown in FIG. 9A or FIG. 9B by a cooperation of foregoing various execution modules.

In summary, in the resource allocation apparatus provided by the embodiments in the present disclosure, the access network device obtains the J (J≥1) types of configuration information, and then notifies the J types of configuration information. The access network device or the target UE may screen out the target configuration information required by the target UE from the J types of configuration information. The access network device or the target UE may flexibly adjust the target configuration information required by the target UE and screened out from the J types of configuration information in the process of the service to meet the requirement of the target UE to transmit the service data. Each type of configuration information includes the information of the resource block to be allocated. Compared with the related art, the content of the configuration information is no longer fixed, so the flexibility of resource allocation is improved.

The embodiments of the present disclosure further provide a resource allocation system, and the system includes an access network device and a target UE.

The access network device includes the resource allocation apparatus shown in FIG. 8A or FIG. 8B.

The target UE includes the resource allocation apparatus shown in FIG. 9A or FIG. 9B.

The embodiments of the present disclosure further provide another resource allocation system, and the system includes an access network device and a target UE.

The access network device includes the resource allocation apparatus shown in FIG. 10.

The target UE includes the resource allocation apparatus shown in FIG. 11.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

It should be understood that the term "and/or" herein is merely an association relationship describing associated objects, indicating that there may be three relationships, for example, A and/or B, may represent three situations: A exists alone, A and B coexist, or B exists alone. In addition, the character "/" herein generally indicates that the contextual objects is of an "or" relationship.

Those skilled in the art may understand that all or part of the steps of implementing the above embodiments may be completed by hardware, or may be instructed by a program to execute related hardware, and the program may be stored in a computer readable storage medium. The storage medium mentioned may be a read only memory, a magnetic disk, an optical disk or the like.

The above description is only preferred embodiments of the present disclosure, and is not intended to limit the disclosure. Any modifications, equivalent substitutions, improvements, etc., which are within the spirit and principles of the present disclosure, should be included in the protection scope of the present disclosure.

What is claimed is:

1. A resource allocation method, applied to an access network device, comprising:
   obtaining J types of configuration information, each type of the configuration information comprising information of a resource block to be allocated, J≥2, and notifying the J types of configuration information,
   wherein each type of the configuration information comprises first sub-information or second sub-information,
   the first sub-information comprises an identifier of a resource block allocated for a target User Equipment (UE) and a number K of Physical Resource Blocks (PRB) comprised in the resource block, K≥1, and
   the second sub-information comprises a number N of the resource block allocated for the target UE, the identifier of the resource block, and information of the PRB comprised in the resource block, N≥1,
   wherein each type of the configuration information comprises the first sub-information, and after the notifying the J types of configuration information, the method further comprises:
      selecting one of a plurality of preset mapping manners as a target mapping manner, each of the mapping manners being used to indicate a grouping manner of the PRB; and
      sending information comprising the target mapping manner to the target UE.

2. The method according to claim 1, wherein, after the notifying the J types of configuration information, the method further comprises:
   selecting first target configuration information from the J types of configuration information, the first target configuration information comprising information of a resource block allocated for a target User Equipment (UE) for transmitting service data; and
   sending notification information comprising the first target configuration information to the target UE.

3. The method according to claim 2, wherein, after the notifying the J types of configuration information, the method further comprises:
receiving indication information sent by the target UE, the indication information being used to indicate at least one of a device type of the target UE, a service type of a service performed by the target UE, and a service level of a service performed by the target UE; and
the selecting the first target configuration information from the J types of configuration information comprises:
selecting the first target configuration information from the J types of configuration information according to the indication information.

4. The method according to claim 2, wherein, J≥2, after the selecting first target configuration information from the J types of configuration information, the method further comprises:
selecting second target configuration information from the J types of configuration information, the second target configuration information being different from the first target configuration information; and
sending notification information comprising the second target configuration information to the target UE.

5. The method according to claim 4, wherein before the selecting the second target configuration information from the J types of configuration information, the method further comprises:
receiving configuration request information sent by the target UE, the configuration request information being used to request the access network device to select the second target configuration information from the J types of configuration information.

6. The method according to claim 2, wherein the notification information comprises x-bit binary data and y-bit binary data located after the x-bit binary data, x≥1, y≥1,
wherein, the x-bit binary data is used to indicate an identifier of the first target configuration information or second target configuration information, the y-bit binary data is used to indicate an identifier of a resource block allocated for the target UE, the second target configuration information is selected by the access network device from the J types of configuration information, and the second target configuration information is different from the first target configuration information.

7. A resource allocation apparatus, applied to an access network device, comprising: a processor and a memory, the memory storing one or more computer programs, and the processor implementing following steps when executing the computer program:
obtaining J types of configuration information, each type of the configuration information comprising information of a resource block to be allocated, J≥1; and
notifying the J types of configuration information,
wherein each type of the configuration information comprises first sub-information or second sub-information,
the first sub-information comprises an identifier of a resource block allocated for a target User Equipment (UE) and a number K of Physical Resource Blocks (PRB) comprised in the resource block, K≥1, and
the second sub-information comprises a number N of the resource block allocated for the target UE, the identifier of the resource block, and information of the PRB comprised in the resource block,
wherein each type of the configuration information comprises the first sub-information, and the processor is further configured to:
select one of a plurality of preset mapping manners as a target mapping manner, each of the mapping manners being used to indicate a grouping manner of the PRB; and
send information comprising the target mapping manner to the target UE.

8. The apparatus according to claim 7, wherein, the processor is further configured to:
select first target configuration information from the J types of configuration information, the first target configuration information comprising information of a resource block allocated for a target User Equipment (UE) for transmitting service data; and
send notification information comprising the first target configuration information to the target UE.

9. The apparatus according to claim 8, wherein, the processor is further configured to:
receive indication information sent by the target UE, the indication information being used to indicate at least one of a device type of the target UE, a service type of a service performed by the target UE, and a service level of a service performed by the target UE; and
select the first target configuration information from the J types of configuration information according to the indication information.

10. The apparatus according to claim 8, wherein, J≥2, the processor is further configured to:
select second target configuration information from the J types of configuration information, the second target configuration information being different from the first target configuration information; and
send notification information comprising the second target configuration information to the target UE.

11. The apparatus according to claim 10, wherein, the processor is further configured to:
receive configuration request information sent by the target UE, the configuration request information being used to request the access network device to select the second target configuration information from the J types of configuration information.

12. The apparatus according to claim 8, wherein the processor is further configured to:
send the notification information comprising the target configuration information to the target UE by using at least one of an RRC protocol, a MAC CE and DCI, the target configuration information comprising the first target configuration information or second target configuration information, the second target configuration information being selected by the access network device from the J types of configuration information, and the second target configuration information being different from the first target configuration information.

13. The apparatus according to claim 7, wherein the processor is further configured to:
notify the J types of configuration information by at least one of System Information (SI), a Radio Resource Control (RRC) protocol, a Medium Access Control (MAC) Channel Element (CE), Downlink Control Information (DCI), and a Physical Broadcast Channel (PBCH).

14. The apparatus according to claim 7, wherein,
the information of the PRB comprises an identifier of the PRB.

15. The apparatus according to claim 7, wherein the processor is further configured to:
- allocate a resource block used for transmitting service data to a target User Equipment (UE) according to information of a resource block comprised in target configuration information, the target configuration information being configuration information required by the target UE and screened from the J types of configuration information.

16. A resource allocation apparatus, applied to a target User Equipment (UE), comprising: a processor and a memory, the memory storing one or more computer programs, and the processor implementing following steps when executing the computer program:
- receiving J types of configuration information notified by an access network device, the J types of configuration information being acquired by the access network device in advance, and each type of the configuration information comprising information of a resource block to be allocated, J≥1,
- wherein each type of the configuration information comprises first sub-information or second sub-information, the first sub-information comprises an identifier of a resource block allocated for the target UE and a number K of Physical Resource Blocks (PRB) comprised in the resource block, K≥1, and
- the second sub-information comprises a number N of the resource block allocated for the target UE, the identifier of the resource block, and information of the PRB comprised in the resource block, N≥1,
- wherein each type of the configuration information comprises the first sub-information, and the processor is further configured to:
  - receive information comprising a target mapping manner and sent by the access network device, the target mapping manner being selected by the access network device from a plurality of preset mapping manners, each of the mapping manners being used to indicate a grouping manner of the PRB; and
  - determine information of the PRB comprised in the resource block allocated by the access network device for itself according to the target mapping manner and the first sub-information.

* * * * *